(12) United States Patent
Washakowski et al.

(10) Patent No.: US 7,346,125 B2
(45) Date of Patent: Mar. 18, 2008

(54) METHOD AND DEVICE FOR PULSE SHAPING QPSK SIGNALS

(75) Inventors: Steven Washakowski, Franklin, MA (US); Wesley G. Brodsky, Medford, MA (US)

(73) Assignee: Raytheon Company, Waltham, MA (US)

( * ) Notice: Subject to any disclaimer, the term of this patent is extended or adjusted under 35 U.S.C. 154(b) by 293 days.

(21) Appl. No.: 10/511,862

(22) PCT Filed: Apr. 23, 2002

(86) PCT No.: PCT/US02/12806
§ 371 (c)(1),
(2), (4) Date: Oct. 15, 2004

(87) PCT Pub. No.: WO03/092233
PCT Pub. Date: Nov. 6, 2003

(65) Prior Publication Data
US 2005/0238117 A1    Oct. 27, 2005

(51) Int. Cl.
*H03C 3/00*    (2006.01)
(52) U.S. Cl. .................................... 375/302
(58) Field of Classification Search ............... 375/302, 375/216
See application file for complete search history.

(56) References Cited

U.S. PATENT DOCUMENTS

| | | | | |
|---|---|---|---|---|
| 3,959,586 A | * | 5/1976 | Blomenkamp | 375/238 |
| 4,682,123 A | * | 7/1987 | Loper et al. | 332/100 |
| 4,736,362 A | * | 4/1988 | Clark et al. | 370/363 |
| 4,737,969 A | * | 4/1988 | Steel et al. | 375/298 |
| 5,212,714 A | * | 5/1993 | Grindahl et al. | 375/216 |
| 5,392,299 A | * | 2/1995 | Rhines et al. | 714/756 |
| 5,440,506 A | * | 8/1995 | Longway et al. | 365/104 |

(Continued)

FOREIGN PATENT DOCUMENTS

WO    WO 99/56443    11/1999

OTHER PUBLICATIONS

Jong-Kwan Choi, Area-Efficient Pulse-Shaping 1:4 Interpolated FIR Filter Based on LUT Partitioning, Sep. 2, 1999, pp. 1-2, vol. 35, No. 18, Electronics Letter.

(Continued)

*Primary Examiner*—David C. Payne
*Assistant Examiner*—Leon-Viet Q Nguyen
(74) *Attorney, Agent, or Firm*—Daly, Crowley, Mofford & Durkee, LLP

(57) ABSTRACT

A baseband shaping device includes a plurality of coefficient memories, each memory having an input address bus, a multiplexor input and a coefficient value output. The device further includes a plurality shift registers, each having an input coupled to a respective one of the coefficient value outputs, a digital to analog clock input and an output. The device further includes a plurality of negative value circuits, each circuit having an input coupled to a respective one of the first shift register outputs and an output, a plurality of multiplexors, each having a first input coupled to a respective one of the first shift register outputs and a second input coupled to a respective one of the output of the plurality of negative value circuits. The device further includes a plurality of second shift registers, and an adder having a plurality of inputs coupled to the plurality of second shift registers.

22 Claims, 14 Drawing Sheets

U.S. PATENT DOCUMENTS

| | | | | |
|---|---|---|---|---|
| 5,519,732 | A * | 5/1996 | Chester | 375/295 |
| 5,523,726 | A * | 6/1996 | Kroeger et al. | 332/103 |
| 5,570,392 | A * | 10/1996 | Young et al. | 375/308 |
| 5,648,988 | A * | 7/1997 | Iwamatsu et al. | 375/232 |
| 5,757,794 | A * | 5/1998 | Young | 370/362 |
| 6,031,431 | A * | 2/2000 | Vinekar | 332/103 |
| 6,075,813 | A * | 6/2000 | Chen et al. | 375/216 |
| 6,144,862 | A * | 11/2000 | Oliver et al. | 455/550.1 |
| 6,175,599 | B1 * | 1/2001 | Lyon et al. | 375/261 |
| 6,263,027 | B1 * | 7/2001 | Yang et al. | 375/302 |
| 6,359,936 | B1 | 3/2002 | Shyue | 375/295 |
| 6,536,005 | B1 * | 3/2003 | Augarten | 714/723 |
| 6,560,296 | B1 * | 5/2003 | Glas et al. | 375/308 |
| 6,873,661 | B1 * | 3/2005 | Ben-Eli | 375/308 |
| 6,879,642 | B2 * | 4/2005 | Taskinen | 375/302 |
| 6,985,492 | B1 * | 1/2006 | Thi et al. | 370/429 |
| 7,046,970 | B2 * | 5/2006 | Nguyen et al. | 455/110 |
| 2001/0055331 | A1 * | 12/2001 | Agazzi et al. | 375/216 |
| 2002/0018600 | A1 * | 2/2002 | Lyon et al. | 382/305 |
| 2002/0049797 | A1 * | 4/2002 | Temerinac | 708/319 |
| 2002/0075092 | A1 * | 6/2002 | Turcotte et al. | 332/100 |
| 2002/0141440 | A1 * | 10/2002 | Stanley et al. | 370/465 |
| 2003/0002570 | A1 * | 1/2003 | Chan | 375/216 |
| 2003/0142764 | A1 * | 7/2003 | Keevill et al. | 375/341 |
| 2004/0141569 | A1 * | 7/2004 | Agazzi | 375/302 |
| 2005/0201481 | A1 * | 9/2005 | Calderbank et al. | 375/265 |

OTHER PUBLICATIONS

Tzu-Chieh Kuo, A Programmable Interpolation Filter for Digital Communications Applications, 1998, pp. II-97-II-100, University of California, Los Angeles.

PCT/US 02/12806 Search Report dated Jan. 3, 2003.

\* cited by examiner

METHOD AND DEVICE FOR PULSE SHAPING QPSK SIGNALS

CROSS-REFERENCE TO RELATED APPLICATIONS

This application is a U.S. National Stage application under 35 U.S.C. §371 of and claims the benefit of PCT Application No. PCT/US02/12806, filed on Apr. 23, 2002, published in the English language on Nov. 6, 2003 as International Publication Number WO 03/092233 A1, which are hereby incorporated herein by reference.

FIELD OF THE INVENTION

This invention relates generally to modulation of RF carrier signals and more particularly to systems and techniques to shape baseband signals for QPSK modulation.

BACKGROUND OF THE INVENTION

In communications applications, it is often desirable to use multiphase modulation techniques to increase bandwidth efficiency in telephone and satellite data communications to transmit binary data as multiple bit symbols and in particular quadrature phase shift keying (QPSK) modulation. However, when using QPSK modulation in data communications terminals, there is often a requirement to limit the spectral characteristics of the radio frequency (RF) modulated signal to reduce intersymbol interference. As is known in the art there are several filtering techniques to shape a baseband signal, wherein a digital signal which is separated into two data streams, an in-phase signal and a quadrature phase signal, also referred to as the quadrature signal, before RF modulation.

Conventional techniques for implementing filters include square root raised cosine (SRRC) filters which provide outputs having data samples generated at a frequency $F_{da}$ which is equivalent to a digital to analog converter clock rate. Typical filter circuits include a tapped delay line filter having filter taps spaced at $1/(F_{da})$ in time. Inputs bits come in at a symbol rate (Rs). Typically the filter coefficients are chosen so that a response to an impulse signal is the SRRC characteristic waveform in the time domain. To provide a baseband signal for modulating a radio frequency (RF) carrier, an impulse signal is input into the filter once per symbol.

This impulse signal consists of the value +1 (for a data "0") or −1 (for a data "1") followed by several samples of value 0. In a typical filter most of the multipliers are multiplying their coefficient by the value 0, and are therefore not being used. This adds digital logic that is not necessarily required.

In communication applications, low cost and compact size are important considerations. Digital filters such as those described above are often implemented as field programmable gate arrays (FPGAs) and application specific integrated circuits (ASICs).

Reducing the required circuitry to implement a particular filter can reduce the cost and size of the filter.

It would, therefore, be desirable to reduce the size and cost of the digital logic for implementing the baseband filter including reducing the volume of circuitry dedicated to the storage of coefficient values for producing the filtered baseband signal.

SUMMARY OF THE INVENTION

In accordance with the present invention, a device includes a plurality of coefficient memories, and each memory having an input address bus, a multiplexor input and a coefficient value output The device further includes a plurality of first shift registers, each having an input coupled to a respective one of the coefficient value outputs, a digital to analog (D/A) clock input and an output. The device further includes a plurality of negative value circuits, each circuit having an input coupled to a respective one of the first shift register outputs and an output, a plurality of 2:1 multiplexors, each multiplexor having a first input coupled to a respective one of the first shift register outputs and a second input coupled to a respective one of the output of the plurality of negative value circuits. The device further includes a plurality of second shift registers, each having an input coupled to a respective one of the outputs of the plurality of 2:1 multiplexors, a digital to analog (D/A) clock input and an output, and an adder having a plurality of inputs coupled to respective ones of the plurality of second shift registers. With such an arrangement, the digital logic implementing the filter and the volume of circuitry dedicated to the storage of coefficient values for producing the filtered baseband signal is reduced.

In accordance with a further aspect of the present invention, a method for shaping a baseband signal includes providing a plurality of coefficient memories, each coefficient memory having a plurality of coefficients values, each of the plurality of coefficient values representing a filter response waveform value, and determining a coefficient memory address for each of the coefficient memories. The method further includes addressing each of the plurality of coefficient memories, retrieving an addressed coefficient value from each of the plurality of coefficient memories, providing a negative value for each of the retrieved coefficient values, selecting in response to the baseband signal, one of the retrieved value and the negative value, summing the selected value for each coefficient for providing a shaped signal. With such a technique, an efficient implementation of square root raised cosine filter is provided having a reduced storage requirement for the filter coefficients.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Before providing a detailed description of the invention, it may be helpful to define some of the terms used in the description. As used herein, two's complement logic coefficients and logic blocks refer to a negative representation of a digital signal value and in particular the negative value of a filter coefficient. As is known, conventional logic building blocks for adders use two's complement arithmetic. It will be appreciated by those of ordinary skill in the art that other representations of the negative coefficient such as offset binary or signed magnitude representations can be used instead of the two's complement representation along with corresponding negative value logic circuits.

For purposes of the present invention, as used herein the term "coefficient" refers generally to a factor which is used to multiply an input bit stream for implementing a specific filter. A coefficient includes a plurality of coefficient values which are discrete digital samples representing filter response waveform values of a particular filter waveform. For example, C0 represent the first coefficient to be used in a specific filter. Coefficient values $C0_0$-$C0_N$ represent discrete samples of the coefficient, and these values are stored in a coefficient memory. The coefficient values are addressed by the coefficient, here C0, and the sample number 0 to N. N is determined by the relationship between the symbol rate and the D/A converter clock rate. For example, if the D/A clock rate is sixteen times the symbol rate, then N would be equal to fifteen and there would be sixteen samples per coefficient.

One inventive concept of this present invention resulted from the realization that because of the symmetry of the filter coefficients the storage requirements for coefficient values could be reduced. By storing the combined coefficient values with the capability to take the negative value, for example the two's complement, of the coefficient values, coefficients are combined to reduce, for example by one-half, the amount of memory required to store baseband signal shaping filter values. Address generation circuitry is provided to address the coefficient memories to provide the coefficient values in the proper order in response to the baseband signals.

Figure 1:
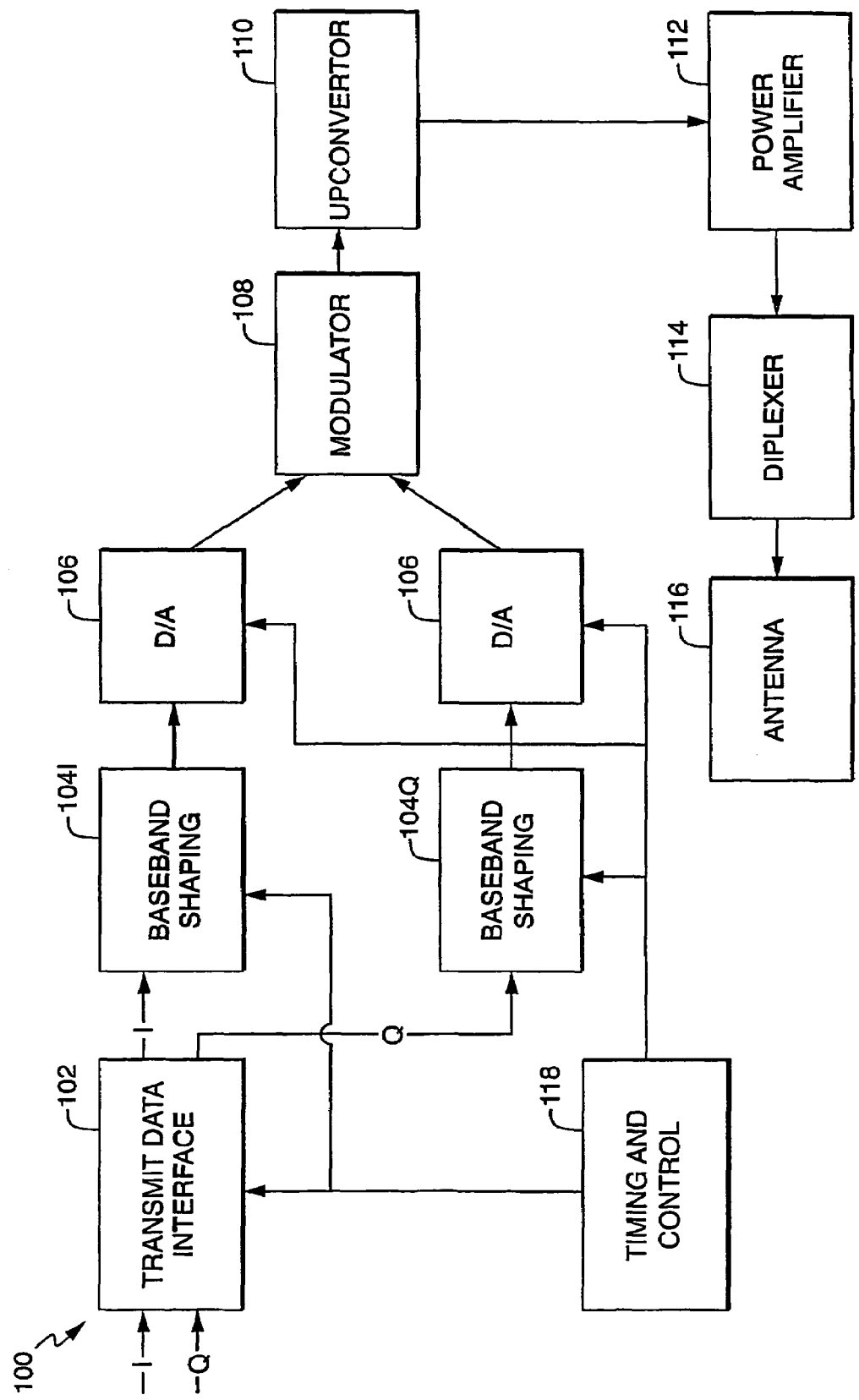
FIG. 1 is a block diagram of a data path processing circuit of a QPSK modulator according to the invention.

Now referring to FIG. 1, an exemplary QPSK modulator 100 according to the invention includes a transmit data interface 102 coupled to an in-phase baseband bit shaping circuit 104I and a quadrature baseband bit shaping circuit 104Q (generally referred to as baseband bit shaping circuits 104). The baseband bit shaping circuits 104I and 104Q each include an input to receive a serial bit stream provided by a plurality of in-phase data symbols and quadrature data symbols respectively. The baseband bit shaping circuits 104I and 104Q each receive timing and control signals from timing and control circuit 118 including a master clock signal, a digital to analog converter (D/A) clock signal and a symbol (SYM) clock input, and each circuit 104I and 104Q includes a D/A output. The QPSK modulator 100 further includes a pair of digital to analog converters (D/A) 106 each coupled to one of the respective baseband bit shaping circuits 104I and 104Q D/A outputs. The D/As are coupled to an RF modulator 108 which is coupled to an upconvertor 110. The upconvertor 110 is coupled to a power amplifier 112 which is coupled to a diplexer 114 which is coupled to an antenna 116 in a known manner.

In one embodiment, the QPSK modulator 100 including portions of the transmit data interface 102 and the baseband bit shaping circuits 104 are implemented in a field programmable gate array (FPGA) in a satellite communications modulator. The transmit data interface 102 and the baseband bit shaping circuits 104 process the data (grouped as symbols) and provide the processed signals as discrete digital waveform values to the dual D/A's 106.

The transmit data interface 102 provides serial data to the baseband bit shaping circuits 104 to provide the in phase and quadrature waveforms to modulate a radio frequency carrier. In one embodiment the transmit data interface 102 selects between a synchronous serial interface or asynchronous parallel interface for transmit data. Utilizing the synchronous serial interface, the external transmit circuitry provides two bits of each data symbol (multi-bit binary data), including one bit I and one bit Q on each rising edge of the clock symbol clock provided by the timing and control circuit 118. Utilizing an asynchronous parallel interface, data to be transmitted is delivered as symbols to the transmit data interface 102 through the byte wide control/status bus and buffered in a first-in first-out register (FIFO) (not shown). The FIFO, which is implemented as part of the transmit data interface 102, allows an external processor (not shown) to send multiple bytes of message data to the transmit data interface 102 prior to transmission. The byte wide output of the FIFO is then parallel to serial converted into two bit symbols for QPSK modulation on each rising edge of the clock symbol clock. It will be appreciated that the exemplary embodiment of FIG. 1 illustrates one of several possible configurations for the QPSK modulation 100.

The baseband bit shaping circuits 104, as described further in connection with FIGS. 2A-4D, shapes the serial data supplied by the transmit data interface and provides the digital waveform representing the filtered baseband signals to the digital to analog converters 106. The digital to analog converters 106 provide an analog waveform to the RF modulator 108 to modulate an RF carrier signal which is converted to a higher frequency by the upconvertor 110. The power amplifier 112 amplifies the upconverted signal which is then received by the diplexer 114. In a transmit mode, the diplexer 114 directs the amplified upconverted signal to the antenna for transmission.

Now referring to FIGS. 2A-2D, an in-phase baseband bit shaping circuit 200I, similar to the baseband bit shaping circuit 104I (FIG. 1), includes a tapped delay line 202I having a plurality of delay elements 203 and a plurality of taps 205 and coupled to an in-phase data bit stream. The circuit 200I further includes a plurality of stages 204a-204n (generally referred to as stage 204), each stage coupled to a corresponding tap 205 of the delay line 202I. Each stage 204 has an output coupled to a corresponding input of an adder 206I which has an output coupled to an input of a scaler circuit 208I. The scaler 208I has an output which is coupled to an in-phase D/A (not shown). A quadrature baseband bit shaping circuit 200Q includes a similar arrangement of circuits.

The quadrature baseband bit shaping circuit 200Q, similar to the baseband bit shaping circuit 104Q (FIG. 1), includes a tapped delay line 202Q having a plurality of delay elements 213 and a plurality of taps 215 and coupled to an quadrature data bit stream. The circuit 200Q further includes a plurality of stages 214a-214n (generally referred to as stage 214), each stage coupled to a corresponding tap 215 of the delay line 202Q. Each stage 214 has an output coupled to a corresponding input of an adder 206Q which has an output coupled to an input of a scaler circuit 208Q. The scaler 208Q has an output which is coupled to an in-phase D/A (not shown).

Figure 2A:
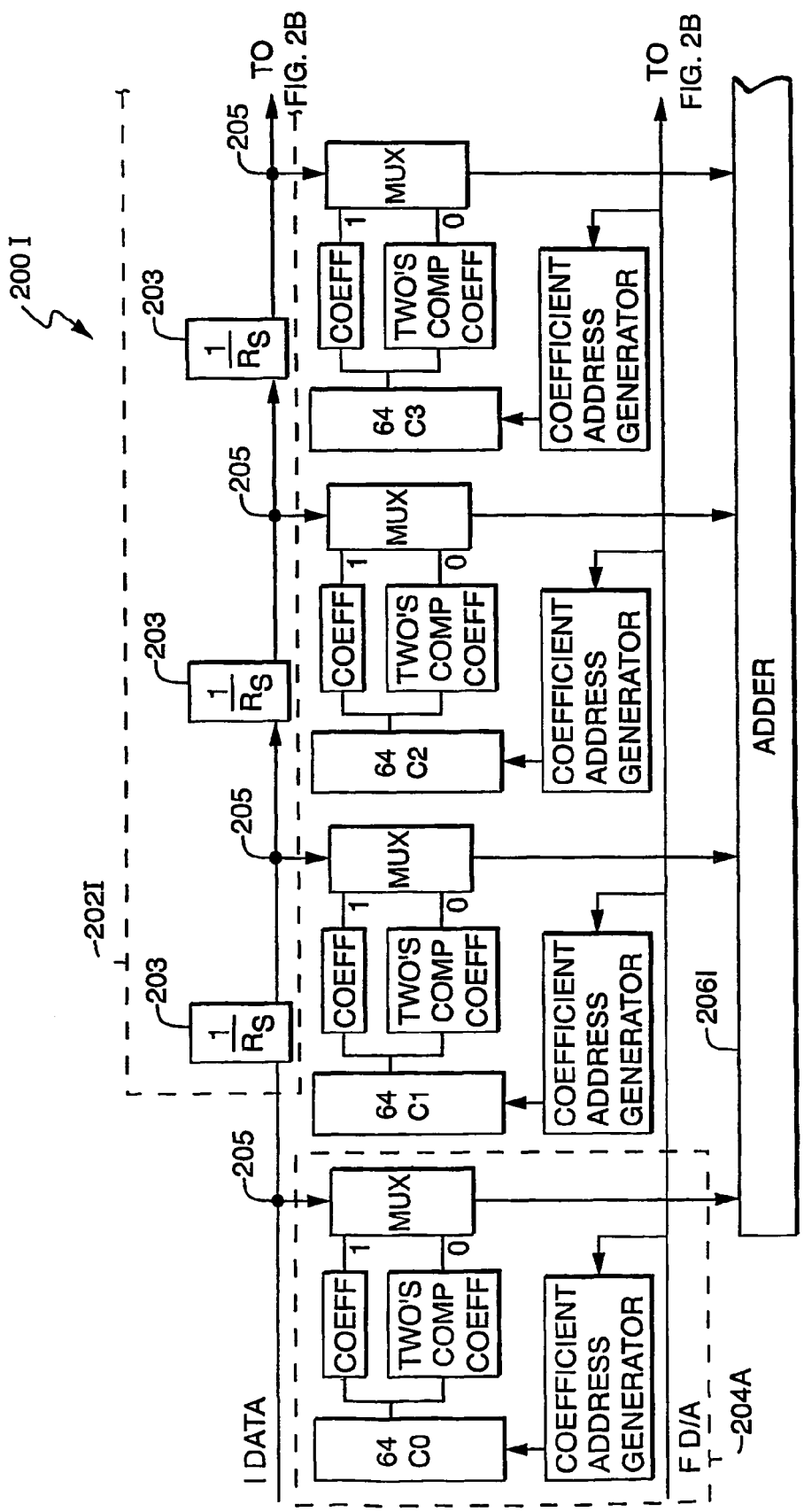
FIGS. 2A-2D are schematics of a baseband shaping circuit according to the invention.
Figure 2B:
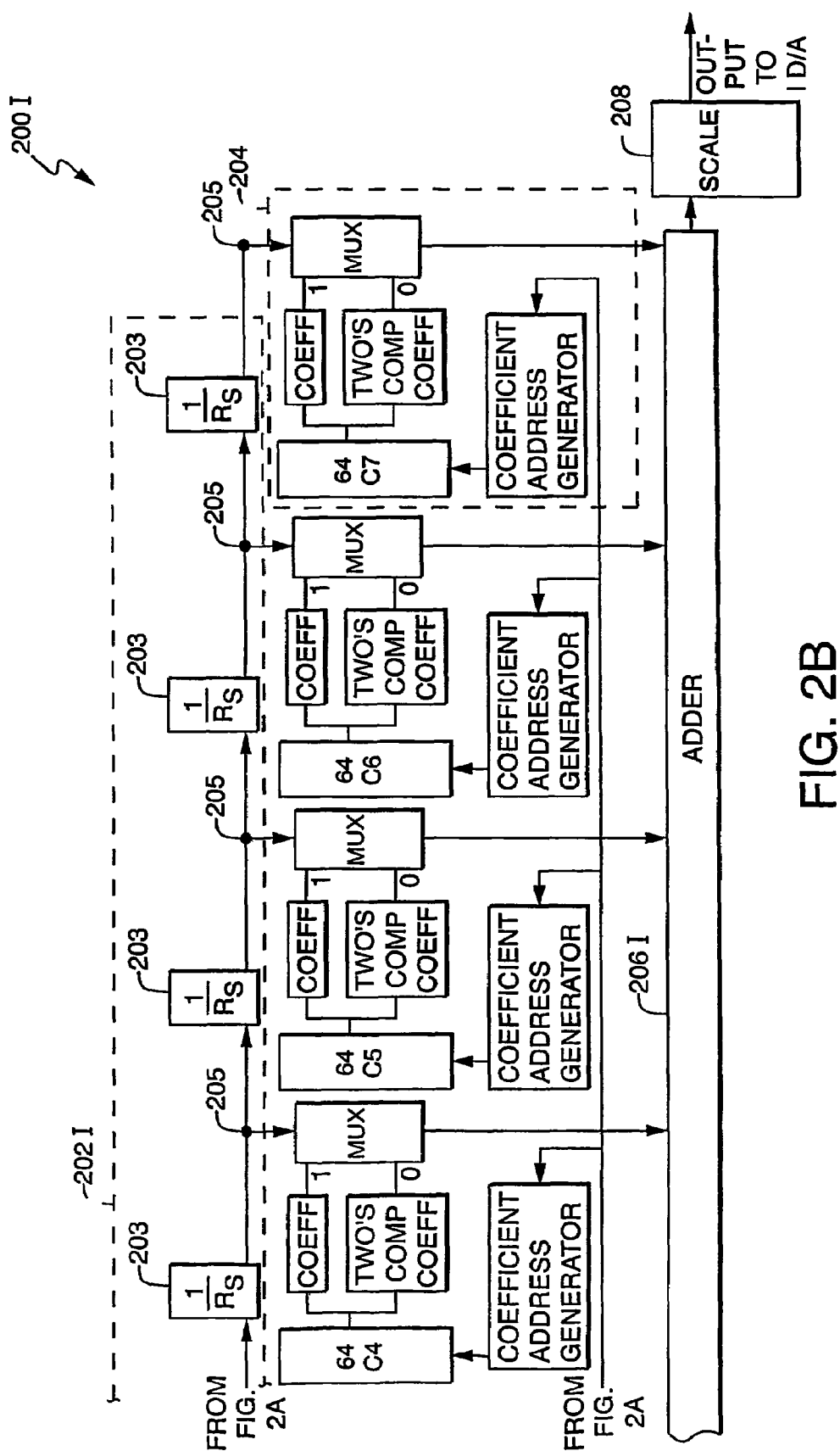
Figure 2C:
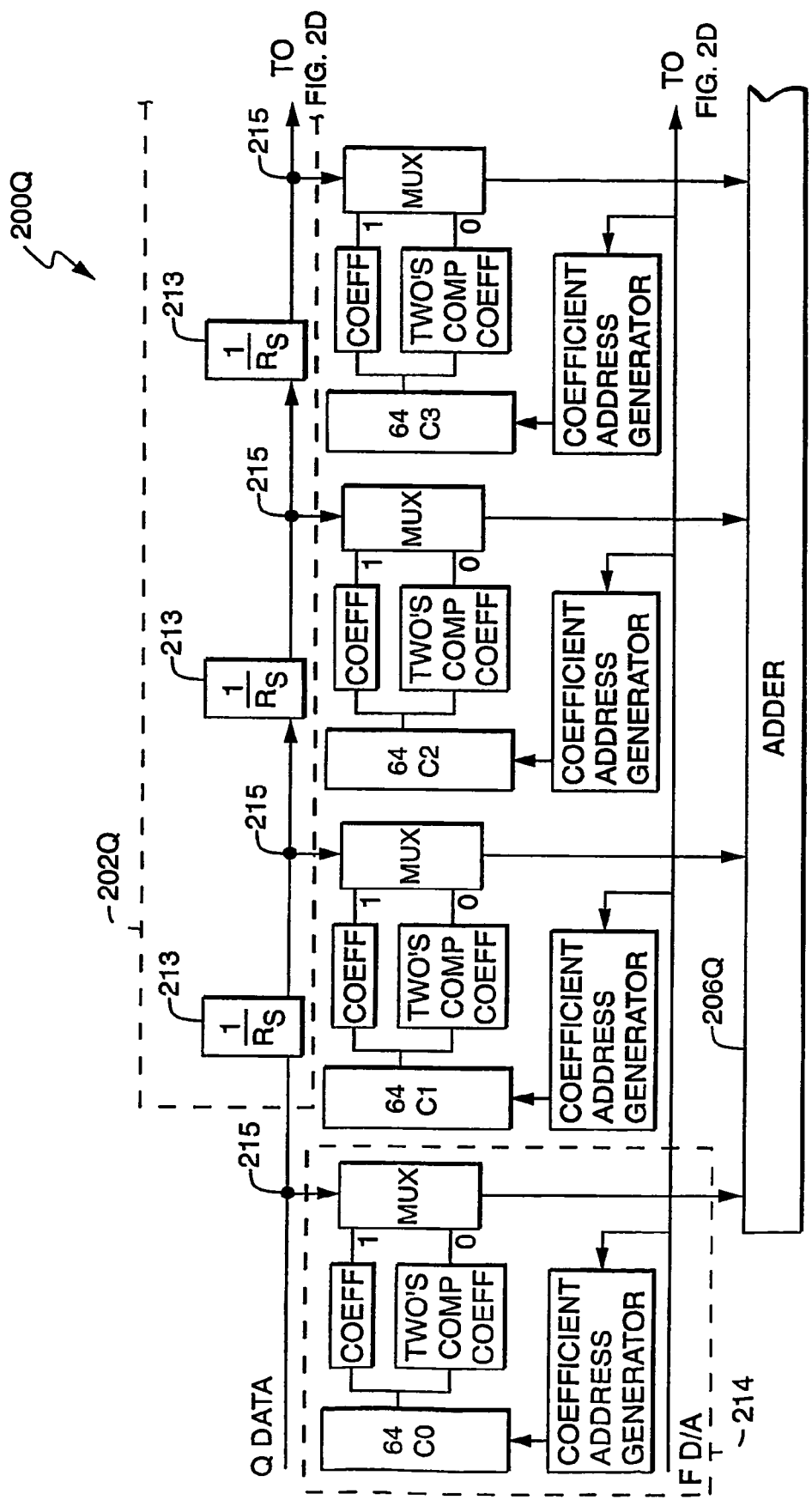
Figure 2D:
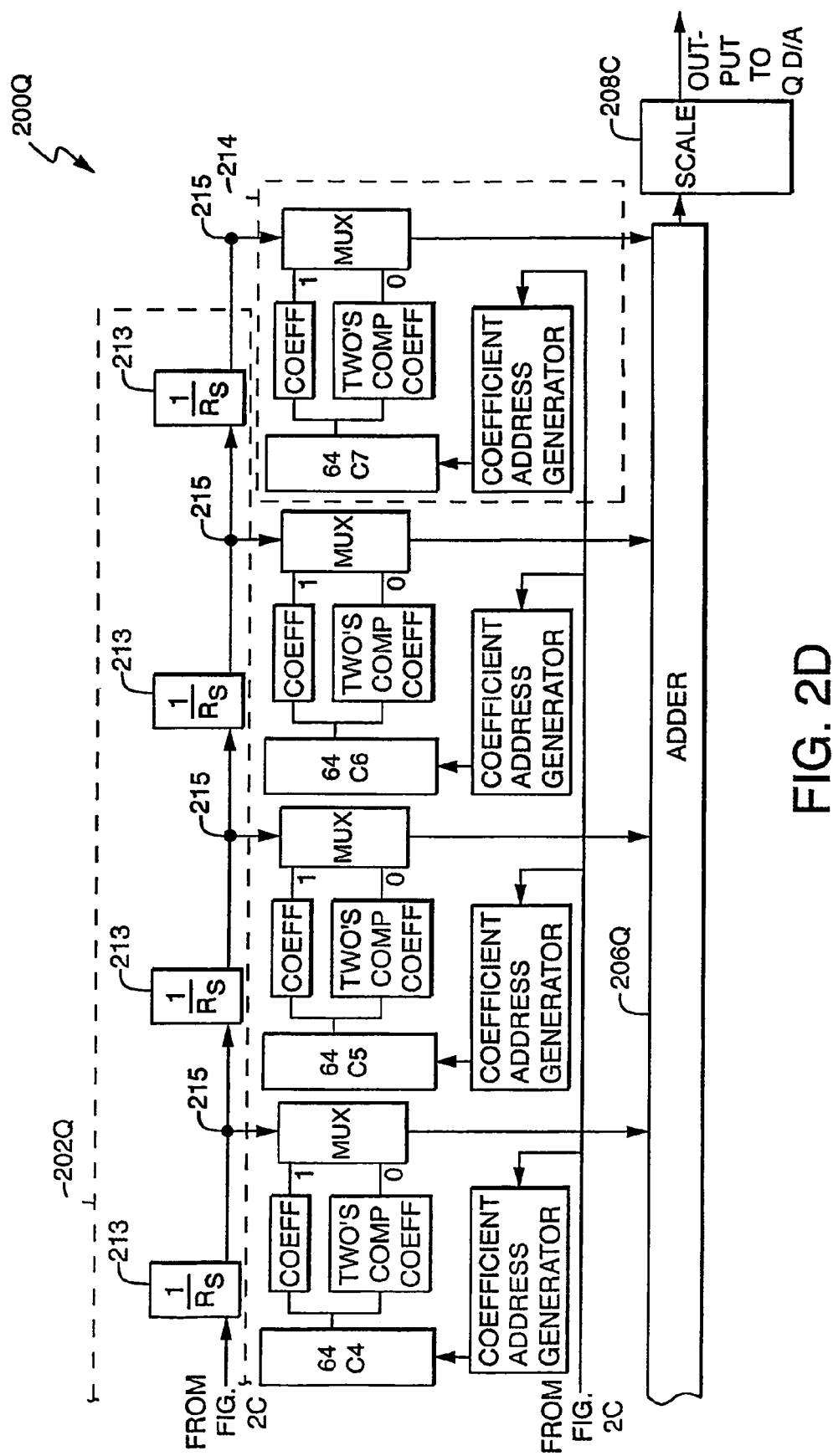
Figure 2E:
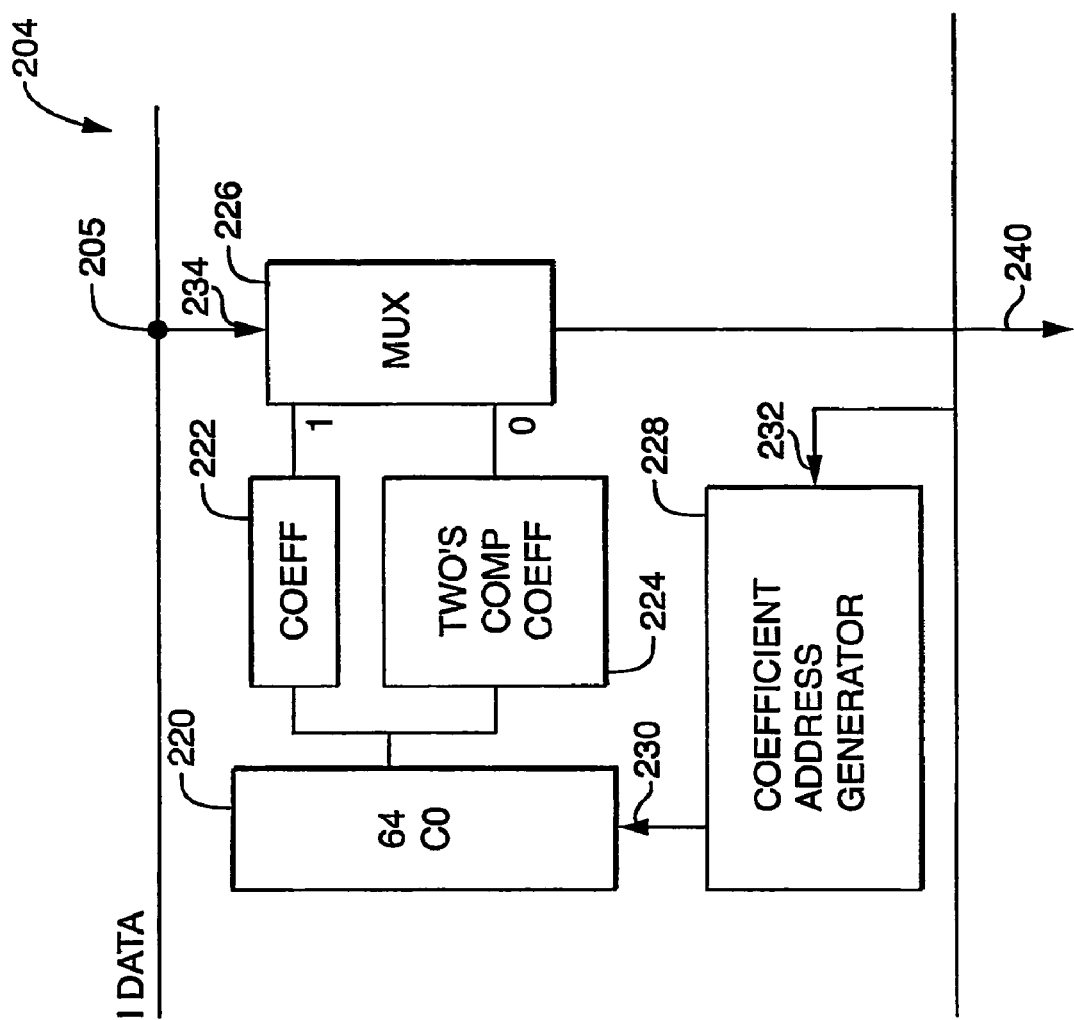
FIG. 2E is a schematic of one stage of the baseband shaping circuit of FIGS. 2A-2D.

Now referring to FIG. 2E, each stage 204 of the baseband shaping circuit 200I of FIGS. 2A-2D includes a coefficient memory 220 coupled to a coefficient address generator 228 through an address bus 230. The coefficient memory 220 includes a clock input signal 232 coupled to the coefficient address generator 228. The coefficient memory 220 includes coefficient memory output 222 which is coupled to a first input of a multiplexor 226. The coefficient memory is also coupled to a negative value circuit 224, here, a two's complement circuit to provide a negative value of the coefficient memory output 222 to a second input of the multiplexor 226. The multiplexor 226 includes a select input 234 coupled to the corresponding tap 205 of the delay line 202 (FIGS. 2A-2D) and an output 240. It should be appreciated a similar circuit is used for each stage 214 of circuit 200Q of FIGS. 2A-2D.

Referring to FIGS. 2A-2E, in operation, the baseband bit shaping circuits 200 provide the digital signal processing necessary for spectral confinement of the modulated output carrier. The coefficient address generator 228 is clocked by the D/A clock to provide coefficient addresses for addressing the coefficient memories to provide waveform samples at the D/A clock frequency. In one embodiment providing QPSK modulation, the baseband bit shaping waveform is a square root raised cosine (SRRC) waveform with various roll-off factors. In one embodiment the roll-off factor is selectable at 25%, 35%, 50% and 70%. The roll-off factor is held constant during a single transmission of a series of symbols which is referred to as a burst. Different sets of coefficient values are stored in the coefficient memory 220 for each roll-off factor. It will be appreciated by those of ordinary skill in the art that several memory arrangements can be provided including loading different sets of coefficient values into the memory 220 when different roll-off factors are selected or having a single larger memory with a different section for each set of coefficient values. After a particular set of coefficient memory values has been selected for a particular burst, the coefficient address generator 228 addresses the selected set of coefficient values in the coefficient memory 220. A particular roll-off factor is selected for a particular burst as a function of transmission bandwidth, and transmitter power amplifier 112 (FIG. 1), and receiver complexity. Lower roll-off factors (e.g.; 25%) use less of the link bandwidth which is advantageous because the lower roll-off factor allows more of the limited bandwidth available to be used by other links. However, the lower-roll off factor causes a higher ratio of peak transmitted power to average transmitted power. The higher ratio requires the transmitter power amplifier to have a higher peak power capability, which makes it more complex. Also, the lower roll-off factor requires a longer matched filter in the receiver which will receive the transmitted waveform. This makes the receiver more complex. Higher roll-off factors (e.g.; 70%) use more of the link bandwidth which is disadvantageous because the higher factor allows less of the limited bandwidth available to be used by other links. But, the higher roll-off factor causes a lower ratio of peak transmitted power to average transmitted power. The lower ratio allows the transmitter power amplifier have a lower peak power capability, which makes it less complex. The lower roll-off factor requires a shorter matched filter in the receiver which will receive the transmitted waveform. This makes the receiver less complex. Providing the flexibility of switching between coefficient memories can require additional storage capacity, but the total storage requirements are reduced by the present invention. It will be appreciated by those of ordinary skill in the art, that once the coefficients are provided according to the present invention, memory banks or other arrangements of the coefficients corresponding to different roll-off factors can be selected using known techniques and the tradeoffs described above.

The stage 204I operates as one tap of a digital filter having a tapped delay line structure which is, here, eight symbols in length with a predetermined set of coefficients for each tap based on the desired roll-off factor. The data is multiplied by the coefficients, with the results from each tap summed in adder 206I, scaled by the scaler circuit 208I and then used to drive the D/A converters 106 (FIG. 1). This structure is similar for both the I and Q channels. The stage 204I is an interpolating filter tap, so for every symbol processed by the filter, there are $N_{INT}$ samples in the waveform provided to the D/A converter 106, where $_{INT}$ refers to interpolation; and $N_{INT}$=(D/A Clock Rate)/(Symbol Rate);

$N_{INT}$=N+1; and

N refers to the sample number described above.

The symbol bit coefficients are "multiplied" by changing or not changing their sign, according to the value (+1 or −1) of each symbol. In one embodiment using twos complement arithmetic, this operation corresponds to using the coefficient value or its "two complement" value. Note that each symbol multiplies each coefficient only once. The effect is the same as if the filter was an 8 $N_{INT}$ long tapped delay line filter (for an 8-tap filter), with impulses (+1 or −1 followed by [$N_{INT}$−1] 0s) as the input to the tapped delay line.

In some analog implementations of the filter, instead of impulses (+1 or −1 followed by [$N_{INT}$−1] 0s) input into the tapped delay line, the +1 or −1 is repeated $N_{INT}$ times. In the second case (repetition), the transmitted spectrum of the waveform would be multiplied by a [sine(fx)/(fx)] function, which is defined as "sinc(fx)." Here, f is the frequency offset from the carrier and x is a factor which depends on the symbol rate. To compensate for this, the coefficients would be computed from the inverse Fourier transform of the desired spectrum after it has been multiplied by [1/sinc(fx)]=[(fx)/sine(fx)]. This is a so-called "inverse sinc function compensation." Since the present invention implements the mathematical equivalent of impulses, this inverse sinc function compensation is not required.

Figure 3A:
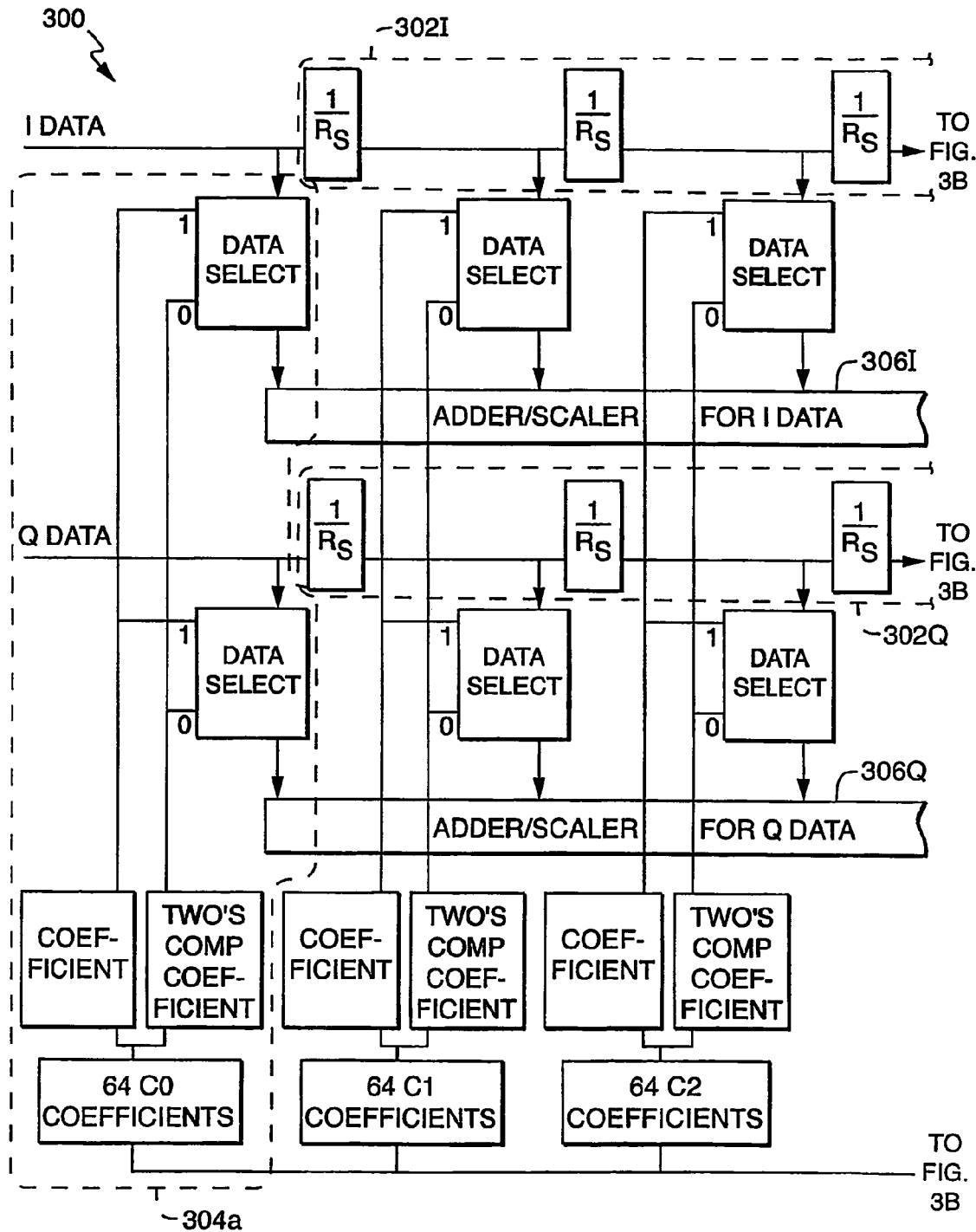
FIGS. 3A-3C are schematics of a baseband shaping circuit according to a further aspect the invention.
Figure 3B:
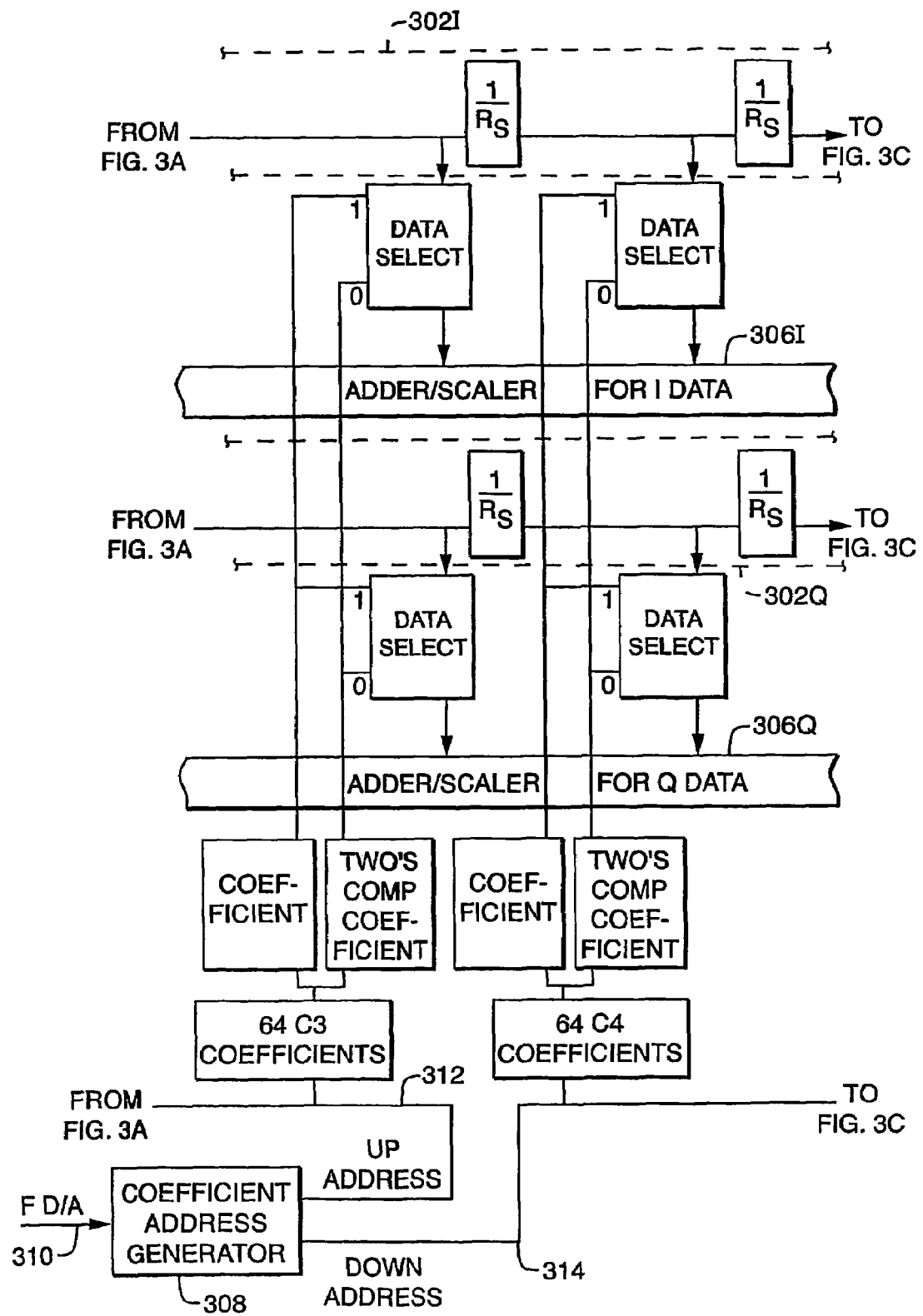
Figure 3C:
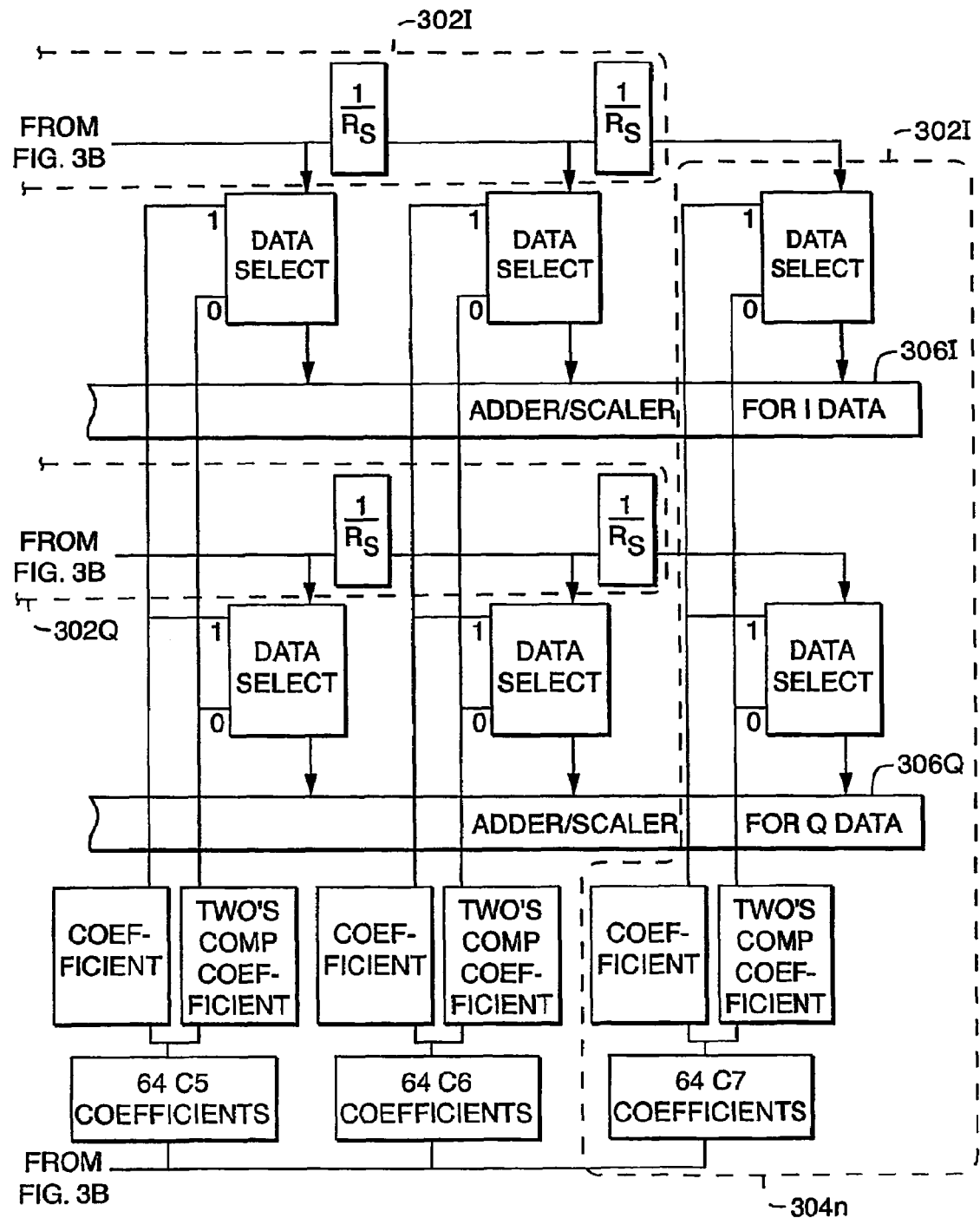

Now referring to FIGS. 3A-3C, a schematic of a baseband shaping circuit 300 according to a further aspect the invention includes tapped delay lines 302I and 302Q similar to the delay line 202I and 202Q of FIGS. 2A-2D respectively. The tapped delay lines 302I and 302Q are coupled to an in-phase data bit stream (I Data) and a quadrature data bit stream (Q Data) respectively. The circuit 300 further includes a plurality of stages 304a-304n, each stage coupled to a corresponding tap of delay line 302I and 302Q. Each stage 304 has outputs coupled to a corresponding input of an adder/scaler circuit 306I and of 306Q respectively. The adder/scaler 306I and 306Q have outputs which are coupled to an in-phase D/A (not shown) and quadrature D/A (not shown) respectively. The circuit 300 includes a common coefficient address generator 308 having a clock input 310 which is coupled to the D/A sample clock, and an up address output 312 coupled to the coefficient memories of a first portion of the stages 304 and a down address output 314 coupled to the coefficient memories of a second portion of the stages 304. A first plurality of stages 304 is coupled to an up address bus 312 coupled to the coefficient address generator 308 which is clocked by the D/A clock. The coefficient address generator 308 is also coupled to a down address bus 314 coupled to a second plurality of the stages 304. One inventive feature of the baseband shaping circuit 300 takes advantage of the fact that the same coefficients are used for each corresponding tap in the I and Q channels, thus allowing logic (e.g. address generators and multiplexors) and coefficient memories to be shared for both the I and Q channels.

Figure 3D:
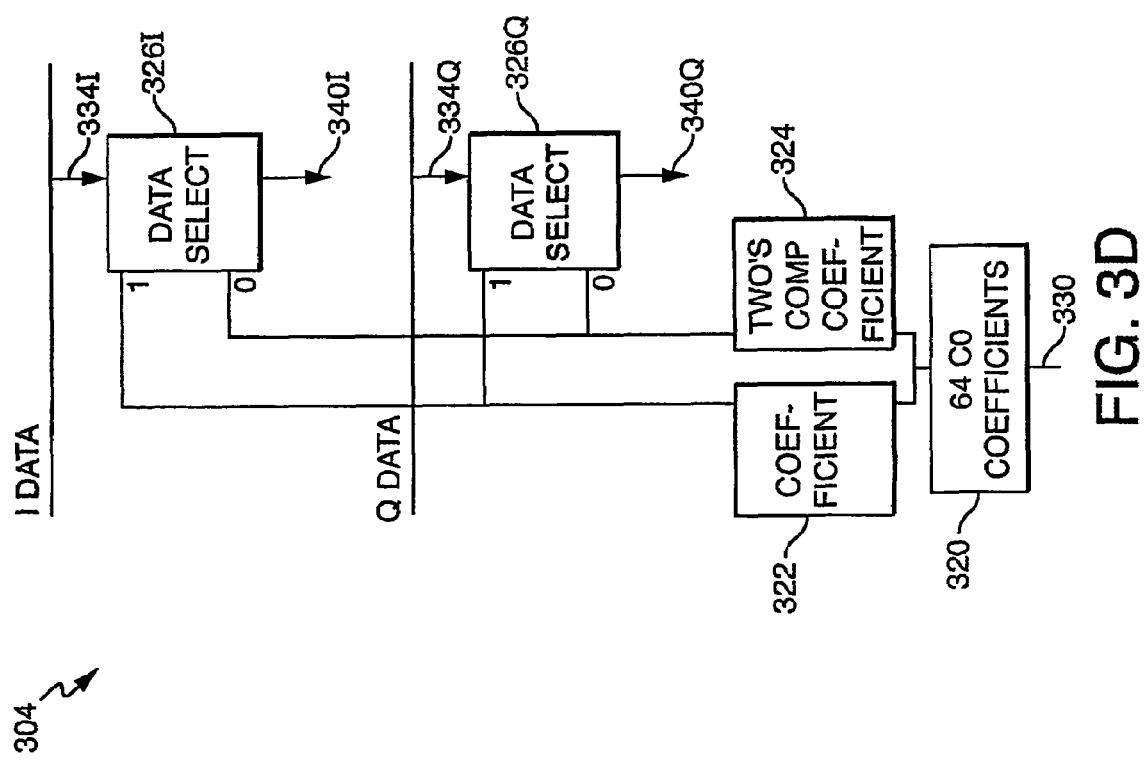
FIG. 3D is a schematic of one stage of the baseband shaping circuit of FIG. 3.

Now referring to FIG. 3D, each stage 304 of the baseband shaping circuit 300 of FIGS. 3A-3C includes a coefficient memory 320 coupled to the coefficient address generator 308 by address bus 330. The coefficient memory 320 is coupled by the address bus 330 to a corresponding one of the up address bus 312 or the down address bus 314 as necessary. The coefficient memory 320 is coupled to a coefficient memory output register 322 which is coupled to a first input of a multiplexor 326I and a first input of a multiplexor 326Q. The coefficient memory 320 is also coupled to a negative value circuit 324, here, a two's complement circuit to provide a negative value of the coefficient memory output 322 to a second input of the multiplexor 326I and a second input of the multiplexor 326Q. The multiplexor 326I includes a select input 334I coupled to the corresponding tap of the delay line 302I (FIGS. 3A-3C) and an output 340I. The multiplexor 326Q each includes a select input 334Q coupled to the corresponding tap of the delay line 302Q (FIGS. 3A-3C) and an output 340Q. In this embodiment of the shaping circuit 300, the address generator 308 provides an incrementing address, up address output 312 (starting at 0 and increasing) and a decrementing address, down address output 314 (starting at the maximum value and decreasing) to address the coefficient memories 320, taking advantage of the symmetry of the coefficients but reverse ordering to provide the symmetrically shaped waveform.

Stage 304 operates in a similar manner as stage 204 (described above in conjunction with FIG. 2E) with the additional feature of providing the addressed coefficient values and the negative coefficient values to both I data stream and the Q data stream at a rate clocked by the D/A clock.

Now referring to FIGS. 4A-4D, an exemplary baseband shaping circuit 400 according to a still further aspect of the invention provides an inventive coefficient storage technique. Circuit 400 includes a coefficient address generator 416 providing an address bus and a plurality of multiplexor most significant bit (MSB) outputs coupled to a multiplexor (MSB) input of a corresponding one of a plurality of coefficient memories 420a-420n (generally referred to as coefficient memory 420). Outputs of the plurality of coefficient memories 420a-420n are coupled to a corresponding plurality of stages 418a-418n (each stage generally referred to as stage 418) each having an in phase (I) output and a quadrature (Q) output. The in-phase (I) outputs are coupled to corresponding stages of adders 450I and 452I having an output coupled to a scale and format converter 470I which has an output coupled to an ID/A converter (not shown). The quadrature (Q) outputs are coupled to corresponding stages of adders 450Q and 452Q having an output coupled to a scale and format converter 470Q which has an output coupled to a Q D/A converter (not shown).

Figure 4A:
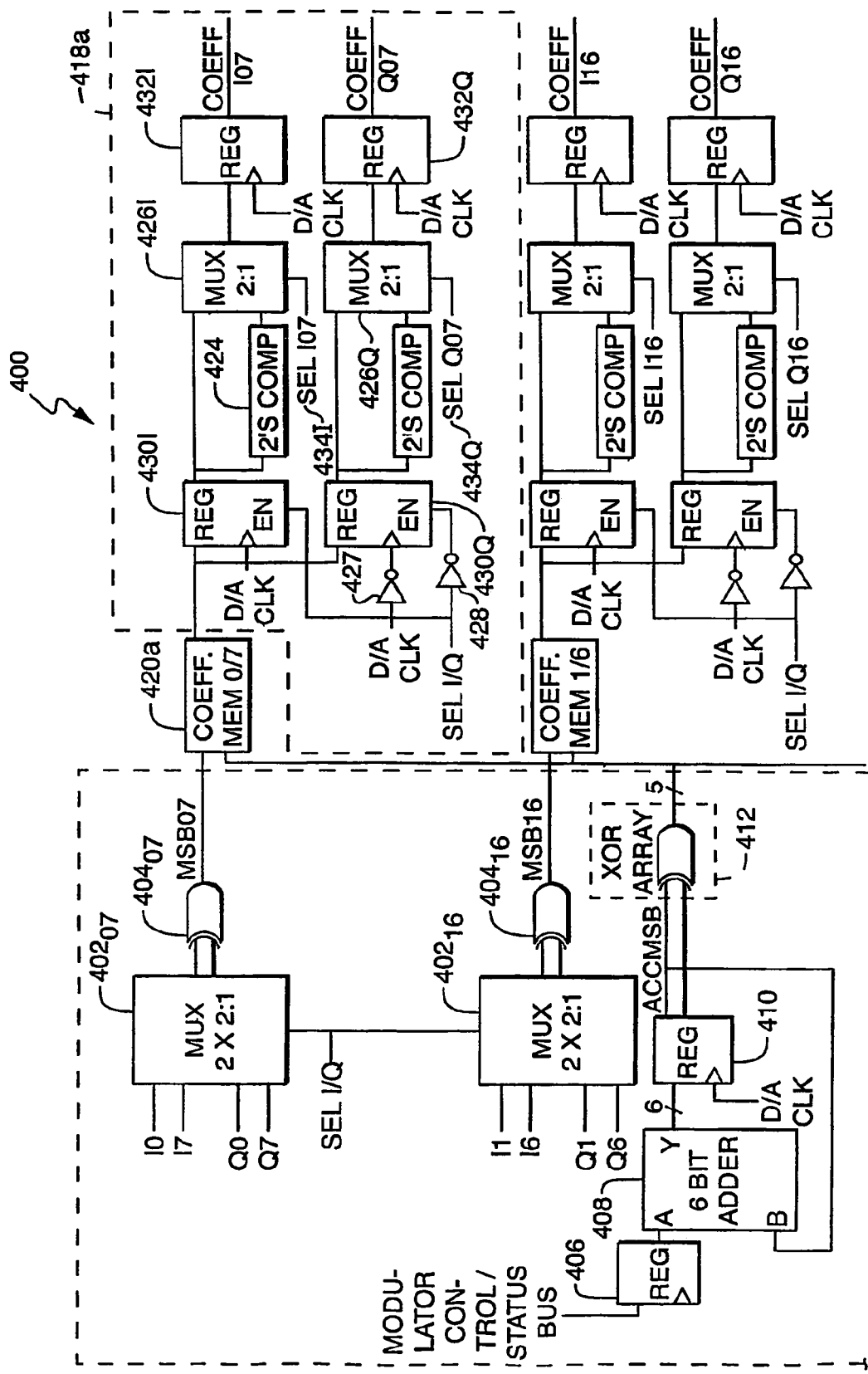
FIGS. 4A-4D are schematics of a baseband shaping circuit according to a still further aspect of the invention.
Figure 4B:
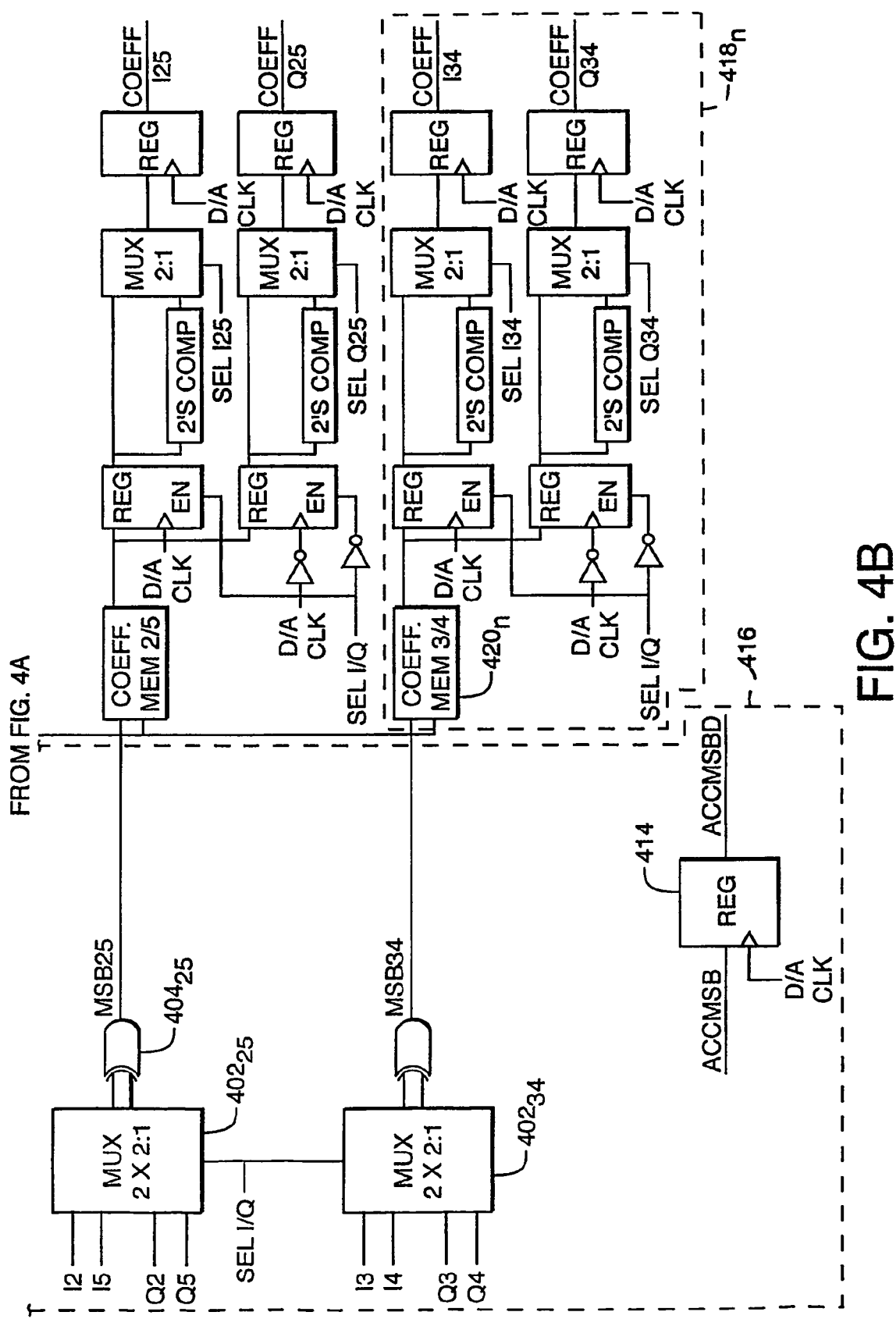
Figure 4C:
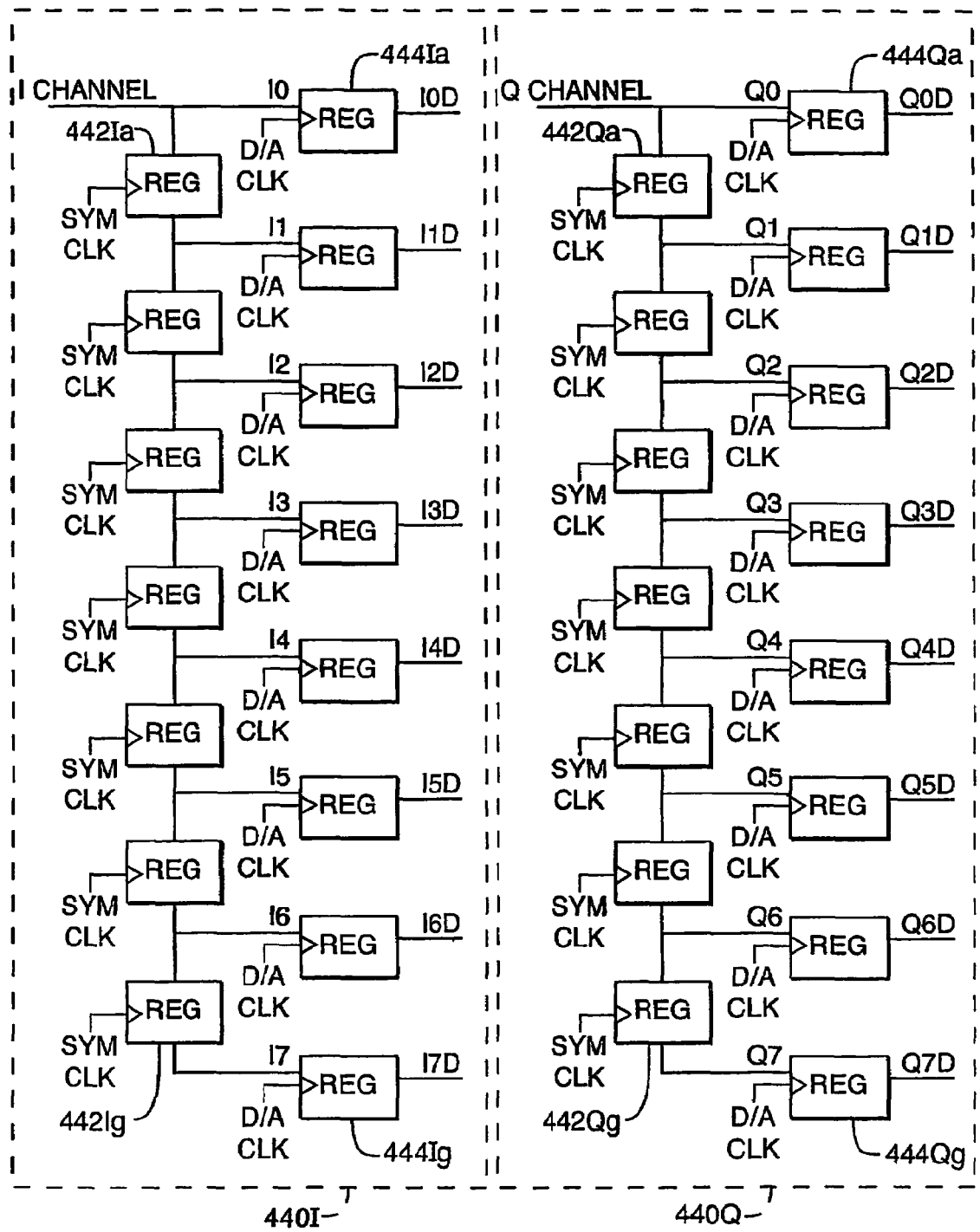
Figure 4D:
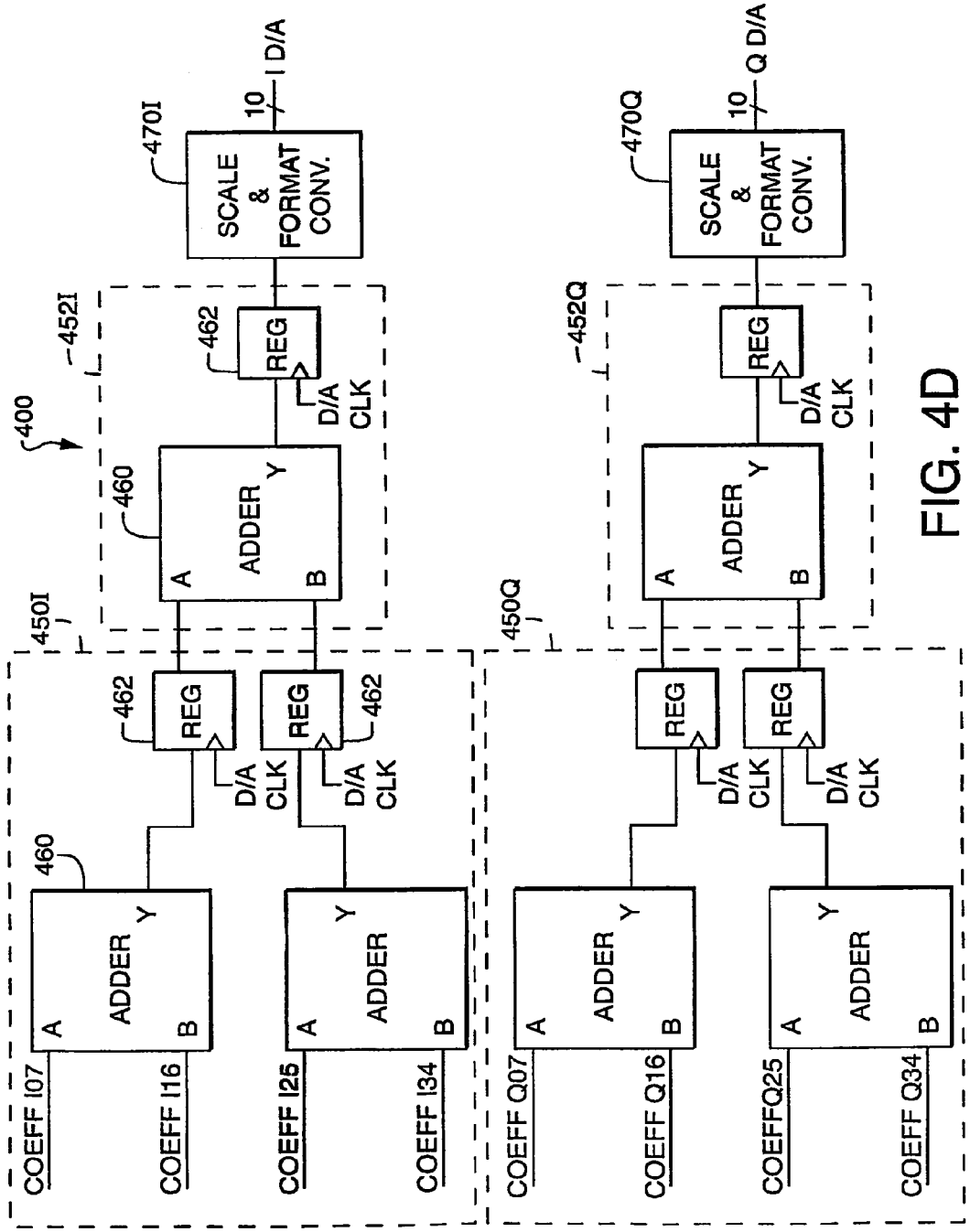

The coefficient address generator 416 includes a plurality of multiplexors $402_{07}$-$402_{34}$ (generally referred to as multiplexors 402), each of the multiplexors 402 having I and Q inputs coupled to corresponding outputs of a two stage I Channel input data (symbol) shift register 440I and a two stage Q Channel input data (symbol) shift register 440Q. The two stage shift registers 440I and 440Q include a shift registers 442I, 444I and 442Q, 444Q respectively coupled in series and in parallel to provide I channel data and Q channel data each clocked by both the symbol clock and the D/A clock as shown in FIG. 4C. The overall operation and signal flow of the circuit 400 starts with the I channel and Q channel shift registers 440I and 440Q respectively in FIG. 4C. The eight individual registers 442Ia-442Ig and 442Qa-442Qg, respectively for each channel represent the eight taps of the delay line in the filter. Symbol data is clocked into the "delay line" at the symbol clock rate. There are multiple D/A clock cycles for each symbol clock cycle, here a minimum of two D/A clock cycles up to a maximum of sixty-four. The outputs of these registers 442 provide the inputs to the multiplexors 402 in the address generator 416 of FIGS. 4A-4B and remain constant for the entire symbol period. The same coefficient memory 420 is used to generate coefficients for both the I and Q channels during each D/A clock cycle. In the first half of the D/A clock cycle, the I channel coefficients are generated, then in the second half of the D/A clock cycle the Q channel coefficients are generated. The outputs of these registers 442 also provide inputs to corresponding inputs of registers 444Ia-444Ig and 444Qa-444Qg (collectively referred to as registers 444). The outputs of registers 444 provide outputs I0D-I7D, Q0D-Q7D as inputs to a digital logic circuit implementing the truth table shown in Table II which provides the SELI07-SELQ07, SELI16, SELQ16, etc. The I0D-I7D, Q0D-Q7D output signals are the I0-I7, Q0-Q7 signals delayed one D/A clock cycle to provide the correct timing relationship with respect to the coefficient memory 420 output.

Now referring to one of the four combined coefficient set C0 and C7, during the first half of the D/A clock cycle the I0 and I7 outputs of registers 442a and 442g are selected by the state of SEL I/Q and are passed through multiplexor $402_{07}$ to the inputs of XOR gate $404_{07}$. Likewise in the second half of the D/A clock cycle the Q0 & Q7 outputs of registers 442 are selected and passed through the multiplexor $402_{07}$ to the XOR gate $404_{07}$. The output of the XOR gate $404_{07}$ forms the most significant bit of the address into the coefficient memory as described in Table I below. Referring now to the I channel, the XOR gate determines whether the symbol bits I0 & I7 have the same value (same value means same sign positive or negative). If symbol bits I0 & I7 have the same value, the coefficient value to be selected from the coefficient memories 420a is the I0+I7 coefficient. If symbol bits I0 & I7 have different values (opposite signs), the I0-I7 coefficient is selected. The desired coefficient is then accessed in the coefficient memories 420a and stored in the register 430 on the rising edge of the D/A clock. The registers 430 are shown in FIG. 4A having the rising clock edge storage and positive (digital "1") enable (EN). When SEL I/Q is high (the first half D/A clock cycle) and providing a rising clock edge, the I coefficient is stored in register 430I. When SEL I/Q is low (the second half D/A clock cycle) and providing a falling clock edge (both clock and EN inputs to register 430Q are inverted), the Q coefficient is stored in register 430Q. In this manner, both the I and Q coefficients are accessed in a single D/A clock cycle.

TABLE I

Modified Coefficient Memory Contents

| ADDRESS Out of Adder 408 | PAIRINGS | SYMMETRY | NEW PAIRINGS | NEW ADDRESS Out of XOR Array 412 | MEMORY ADDRESS MSB07 plus New Address | MEMORY CONTENT |
|---|---|---|---|---|---|---|
| 1111 | $C0_0$ & $C7_{15}$ | $C0_0 = C7_0$ | $C0_0$ & $C0_{15}$ | 000 | 0000 | $C0_0 + C0_{15}$ |
| 0000 | $C0_{15}$ & $C7_0$ | $C0_{15} = C7_{15}$ | $C0_{15}$ & $C0_0$ | 000 | 1000 | $C0_0 - C0_{15}$ |

TABLE I-continued

Modified Coefficient Memory Contents

| ADDRESS Out of Adder 408 | PAIRINGS | SYMMETRY | NEW PAIRINGS | NEW ADDRESS Out of XOR Array 412 | MEMORY ADDRESS MSB07 plus New Address | MEMORY CONTENT |
|---|---|---|---|---|---|---|
| 1110 | $CO_1$ & $C7_{14}$ | $CO_1 = C7_1$ | $CO_1$ & $CO_{14}$ | 001 | 0001 | $CO_1 + CO_{14}$ |
| 0001 | $CO_{14}$ & $C7_1$ | $CO_{14} = C7_{14}$ | $CO_{14}$ & $CO_1$ | 001 | 1001 | $CO_1 - CO_{14}$ |
| 1101 | $CO_2$ & $C7_{13}$ | $CO_2 = C7_2$ | $CO_2$ & $CO_{13}$ | 010 | 0010 | $CO_2 + CO_{13}$ |
| 0010 | $CO_{13}$ & $C7_2$ | $CO_{13} = C7_{13}$ | $CO_{13}$ & $CO_2$ | 010 | 1010 | $CO_2 - CO_{13}$ |
| 1100 | $CO_3$ & $C7_{12}$ | $CO_3 = C7_3$ | $CO_3$ & $CO_{12}$ | 011 | 0011 | $CO_3 + CO_{12}$ |
| 0011 | $CO_{12}$ & $C7_3$ | $CO_{12} = C7_{12}$ | $CO_{12}$ & $CO_3$ | 011 | 1011 | $CO_3 - CO_{12}$ |
| 1011 | $CO_4$ & $C7_{11}$ | $CO_4 = C7_4$ | $CO_4$ & $CO_{11}$ | 100 | 0100 | $CO_4 + CO_{11}$ |
| 0100 | $CO_{11}$ & $C7_4$ | $CO_{11} = C7_{11}$ | $CO_{11}$ & $CO_4$ | 100 | 1100 | $CO_4 - CO_{11}$ |
| 1010 | $CO_5$ & $C7_{10}$ | $CO_5 = C7_5$ | $CO_5$ & $CO_{10}$ | 101 | 0101 | $CO_5 + CO_{10}$ |
| 0101 | $CO_{10}$ & $C7_5$ | $CO_{10} = C7_{10}$ | $CO_{10}$ & $CO_5$ | 101 | 1101 | $CO_5 - CO_{10}$ |
| 1001 | $CO_6$ & $C7_9$ | $CO_6 = C7_6$ | $CO_6$ & $CO_9$ | 110 | 0110 | $CO_6 + CO_9$ |
| 0110 | $CO_9$ & $C7_6$ | $CO_9 = C7_9$ | $CO_9$ & $CO_6$ | 110 | 1110 | $CO_6 - CO_9$ |
| 1000 | $CO_7$ & $C7_8$ | $CO_7 = C7_7$ | $CO_7$ & $CO_8$ | 111 | 0111 | $CO_7 + CO_8$ |
| 0111 | $CO_8$ & $C7_7$ | $CO_8 = C7_8$ | $CO_8$ & $CO_7$ | 111 | 1111 | $CO_7 - CO_8$ |

Signal 434I SELI07 is generated by logic implementing a truth table as described in Table II below. In response to signal 434I, the multiplexor 426 provides true output of the register 430 for the first half of the samples for the current symbol (e.g. if there are eight D/A samples per symbol, the first half would be samples 0, 1, 2 and 3 and the second half would be 4, 5, 6 and 7). The multiplexor 426 provides the negative (two's complement) output 424 of the register 430 for the second half of the samples. Depending on the output of the XOR gate $404_{07}$, the coefficient memory 420 provides either the coefficient value I0+I7 or I0−I7. The signal 434I SELI07 then selectively provides the two remaining coefficient combinations —(I0+I7) or (I7−I0). The address counter most significant bit (ACCMSB) signal changes from a binary digital logic "1" to a "0" when there is a transition from the first half of the samples for a symbol to the second half of the samples. The output is stored in registers 432 which provide the coefficient values as input to the adder chains 460 of FIG. 4D.

It should be noted that only four inputs are added for each channel even though there are eight taps to the filter, because symmetric coefficient pairs are combined in the programming of the coefficient memories 420. An additional point to note about the address generator 416 is that it always counts up in binary to the same "rollover" point with six bits of count (six bits provides counts from zero to sixty-three then rolls over to zero and starts again). The count increment stored in register 406 is modified based on the number of D/A samples per symbol (e.g. if eight samples per symbol are desired, the number eight is stored in register 406, if four samples per symbol are desired, the number sixteen is stored in register 406.

Each of the multiplexors 402 has two outputs which are coupled to two inputs of an exclusive or logic (XOR) gate 404 and the output of the logic gate 404 is coupled to the multiplexor (MSB) input of the corresponding coefficient memory 420. The coefficient address generator 416 further includes a register 406 coupled to a modulator control/status bus and having an output coupled to an input of a multiple bit adder 408, here a six bit adder. The adder 408 has an output coupled to a register 410 which has a clock input coupled to the D/A clock. The register 410 has a first output which is the sum produced by the adder and each of the lower bits, here the lower five bits, which are coupled to a first input of an XOR gate array 412. The register 410 has a second output which is the most significant bit produced by the adder 408 and is coupled to a second input of the XOR gate array 412 and to a second input of the adder 408. The XOR gate array 412 has a multiple bit output which is coupled to the address bus input of the corresponding coefficient memory 420. Each lower order bit in the output of adder 408 is XOR'ed with the most significant bit produced by the adder 408. Equivalently in Table I, the XOR gate array 412 converts the ADDRESS to the corresponding NEW ADDRESS, which is combined, example with the output of the XOR gate $404_{07}$ to provide the MEMORY ADDRESS for addressing the coefficient memory 420.

Each stage 418, which is similar to stage 304 (FIGS. 3A-3C), includes a pair of registers 430I and 430Q, each register having a coefficient input coupled to a corresponding coefficient memory 420, a clock input coupled to the D/A clock and an enable input coupled to a SEL IQ. The clock input to register 430Q is inverted by an inverter 427. Each of the pair of registers 430I and 430Q has an output coupled to a first input of a multiplexor 426I and a multiplexor 426Q respectively. The output of registers 430I and 430Q is also coupled to negative value circuits 424, here, two's complement circuits to provide a negative value of the coefficient in registers 430I and 430Q as outputs to respective second inputs of the multiplexor 426I and the multiplexor 426Q. The multiplexor 426I includes a select input 434I coupled to a SEL I/Q XY signal, and the multiplexor 426I has a COEFF I XY output. The multiplexor 426Q each includes a select input 434Q coupled to a SEL I/Q XY signal and a COEFF Q XY output.

A register 414 of the coefficient address generator 416 has an input coupled to the most significant bit produced by the adder 408 and a clock input coupled to the D/A clock, and provides a signal ACCMSBD to logic implementing a truth table (described below in more detail in conjunction with Table II) to provide the SEL I/Q XY signals.

The first adder stage 450I includes a plurality of adders 460 having a pair of input coupled to the corresponding pair of COEFF I/Q XY outputs from stage 418, and an output coupled to a pipelined register 462. The register 462 has an output coupled to an input of an adder 460 in a second adder stage 452I. It will be appreciated by those of ordinary skill in the art that the number and configuration of the adder stages 450I and 452I can be provided in several equivalent arrangements.

In a similar manner, the first adder stage 450Q includes a plurality of adders 460 having a pair of input coupled to the corresponding pair of COEFF I/Q XY outputs from stage 418, and an output coupled to a pipelined register 462. The register 462 has an output coupled to an input of an adder 460 in a second adder stage 452Q. It will be appreciated by those of ordinary skill in the art that the number and configuration of the adder stages 450Q and 452Q can be provided in several equivalent arrangements. After the adder stages 450I, 452I 450Q and 452Q sum the pipelined coefficient values, the respective scale and format converters 470I and 470Q scale and format the waveform output samples for D/A conversion.

Further improvement in reducing coefficient storage requirements is achieved by some additional complexity in the circuit 400. In an embodiment, having for example eight coefficients corresponding to eight filter taps, the circuit 400 takes advantage of the symmetry in the coefficients (i.e. the same coefficient set is used for C0 and C7, C1 and C6, C2 and C5, C3 and C4). It should be noted that some coefficients are accessed in reverse order to provide the trailing portion of the filter waveform. Further combining the coefficient pairs by storing the sums and differences in the coefficient memories 420 rather than the individual coefficients cuts coefficient storage requirements in half and an additional adder stage can be eliminated. Table I illustrates this coefficient storage approach for a sixteen coefficient values for each of eight filter tap coefficients.

In operation the coefficient memory addresses are generated by the coefficient address generator 416 operating as a counter that counts the desired number of D/A samples per symbol (here up to the maximum number of 64 which is equal to the size of coefficient memory 420). The increment of the count varies based on the number of samples per symbol divided into the maximum number of 64. Register 406 is loaded with the selected increment. Therefore, for a given transmission rate generating D/A samples at a rate of 16 samples per symbol, the counter would increment by 4 each D/A clock cycle, thereby using every fourth coefficient value in the coefficient memory 420. The address counter is implemented as an adder/accumulator where the increment is provided as input to the adder/accumulator and the accumulated "sum" forms the actual address to the coefficient memory 420. The baseband shaping circuit 400, supports more than one transmission rate which is related to power consumption. The transmission rate is selectable via a combination of the selectable frequency of the D/A clock and the increment value programmed into register 406.

The sum and difference waveform values represented by the positive coefficient values (also referred to as the true values) and the two's complement (negative) coefficient values are selected by the multiplexors 426 based upon the value of the data symbols at the 8 taps of the filter shift registers 442 (registers that are clocked on the symbol clock, not the D/A clock) and the current count of the D/A sample number (i.e. if there are 64 samples per symbol, which of the 64 samples is currently selected).

In operation the baseband shaping circuit 400 uses the symbol data bits as a positive or negative multiplier (i.e. data symbol bit "1"=+1, data symbol bit "0"=−1) to alter the sign of the coefficient for each of the taps of the filter, here eight taps. For a given coefficient pair set (i.e. two taps out of the filter, e.g. C0 and C7), upon multiplication by the symbol bit, one of the following quantities is formed: C0+C7; C0−C7; C7−C0; or −C0−C7, and, since −C0−C7=−(C0+C7) and C 7−C0=−(C0−C7), only two quantities need to be stored in memory (C0+C7 and C0−C7) with the capability to take the negative value, here the two's complement, of the coefficient in accordance with the present invention. The determination of when to negate the coefficient value is based on the two data bits from the tapped delay line, here two stage I/Q Channel input data (symbol) shift registers 440, and the most significant bit of the coefficient address generator 416 since this bit indicates the need for reverse order pairing as shown in the New Pairings column of Table I.

The coefficient address generator 416 provides a means to step through the coefficient memory in increments of 1, 2, 4, 8, 16 or 32, which corresponds to 64, 32, 16, 8, 4, 2 D/A samples per symbol. The most significant bit (MSB) of the address counter adder 408 is used to invert the rest of the counter address output bits in the XOR array 412 to take advantage of the symmetry of the coefficients as seen at mid-symbol (i.e. if required to generate 16 D/A samples per symbol, the first 8 coefficients will be a mirror image of the last eight as referenced to mid-symbol as seen in reference to the New Pairings column in Table I).

The output of the XOR gate $404_{07}$, the signal MSB07 is simply an XOR of the two data symbol bits from the two taps of the filter shift registers 442 combined to operate on the given coefficient memory (C0 & C7, C1 & C6, C2 & C5, C3 & C4), here for example C0 & C7. This XOR output indicates whether the bits are the same or different. If they are the same, this means the coefficient to be used will be either C0+C7 or −(C0+C7). If they are different, this means the coefficient to be used will be either C0−C7 or −(C0−C7) (note only C0+C7 and C0−C7 are actually stored in memory and the negative of these coefficient values is created with digital logic.

The truth table as shown in Table II and implemented in the FPGA of circuit 400, provides the SEL I/Q XY signal,
where I/Q indicates which register 430I or 430Q receives the coefficient value; and
XY indicates the coefficient pair.

TABLE II

MUX SELECTS SEL I/Q XY TRUTH TABLE

| ACCMSBD | I/Q XD | I/Q YD | SEL I/Q XY |
|---|---|---|---|
| 0 | 0 | 0 | Negative Coefficient |
| 0 | 0 | 0 | Negative Coefficient |
| 0 | 1 | 0 | Positive Coefficient |
| 0 | 1 | 1 | Positive Coefficient |
| 1 | 0 | 0 | Negative Coefficient |
| 1 | 0 | 1 | Positive Coefficient |
| 1 | 1 | 0 | Negative Coefficient |
| 1 | 1 | 1 | Positive Coefficient |

The truth table, Table II includes the logical relationship between the most significant bit of the address counter (adder/accumulator) and the two data symbol bits to generate the SELI/Q XY signals (e.g. SELI07, SELQ07) which determines whether the positive or negative value of the coefficient memory value (i.e. C0+C7 or −(C0+C7)) is provided as output to the adder stages 450 and 452.

In certain embodiments, depending upon the speed of the device family (e.g. FPGA or ASIC devices) used to implement the baseband shaping circuit 400 and the desired transmission rate, the mathematical processing of a given input symbol cannot be performed in a single system clock cycle (i.e. symbol data input to first D/A sample out), therefore, the process is divided into a number of steps, each performed in a single clock cycle. The implementation is then "pipelined" where the registers 462 are placed at the output of each processing step to resynchronize the outputs to the system clock. The result is a fixed delay or latency between input symbol and the first output D/A sample at the start of a transmission burst but then all other D/A samples follow in sequence on consecutive clock cycles as provided by input data (symbol) shift registers 440I and 440Q which are similarly pipelined.

For clarity, Table I represents only the C0 and C7 coefficient set pairing. A similar pairing exists the remaining coefficient sets C1 & C6, C2 & C5 and C3 & C4. For example, replace C0 with C1 and C7 with C6 to provide the table coefficient set pairing for C1 and C6 and so forth. For a given coefficient pair set, upon multiplication by the symbol bit, the adder forms one of the following quantities: C0+C7; C0−C7; C7−C0; or −C0−C7.

In addition, since −C0−C7=−(C0+C7) and C7−C0=−(C0−C7), only two quantities, for example, (C0+C7) and −(C0−C7) need to be stored in memory with the capability to provide the negative value. The determination of when to negate the coefficient value, here using the negative value circuit 424 is based on the two data bits from the tapped delay line and the most significant bit of the base address generator since this bit indicates the need for reverse order pairing as shown in the New Pairings column of Table I.

As indicated in Table I, each coefficient, for example, C0 comprises a set of coefficient values $C0_0$–$C0_n$ where n equals the number of samples to be provided at the D/A clock rate for a given symbol period. The values in Table I are provided for n=15 which provides 16 samples per symbol period.

As the data symbols are entered into the input data (symbol) shift register 440I and 440Q, the circuit 400 provides as many as 64 discrete samples per symbol. Note that Table I provides an example having sixteen samples per symbol for clarity. The pairings column of Table I represent the values used from the two coefficients C0 and C7 to produce any of the 16 discrete output samples. There are similar pairings of C1 with C6, C2 with C5 and C3 with C4. The symmetry column of Table I illustrates the symmetry in the coefficients for C0 and C7. The same symmetry applies to C1 with C6, C2 with C5 and C3 with C4. The New Pairings column of Table I substitutes the C0 value for the C7 value to translate the coefficient values to a single set of 16 values, in this case the C0 values. The same pairing applies to C1 with C6, C2 with C5 and C3 with C4. The new address column of Table I shows that based on the new pairings, the initially required address range shown in the first column is reduced by a factor of two since the coefficient values in the new pairings column repeat (i.e. each pairing is used twice).

The memory address and memory content columns of Table I represent the physical address scheme implemented in circuit 400 and contents of the memory which provides two of the possible four combinations of the two coefficient values (C0x+C0y or C0x−C0y). The remaining two possible values are obtained by taking negative value, here for example the two's complement of the values (−C0x−C0y or −C0x+C0y, respectively).

The logic as shown by the truth table of Table II represents the implementation of the lookup table and the coefficient values based on the memory address and memory content columns of Table I. In Table II, ACCMSBD represents the output signal of register 414, and I/Q XD and I/Q YD represent the corresponding outputs of the shift registers 444I and 444Q of the two stage I Channel input data (symbol) shift register 440I and the two stage I Channel input data (symbol) shift register 440Q. The logic in the truth table also includes the combination of both I and Q channel lookups in a single set of 4 coefficient tables rather than one for each (i.e. the coefficient memories are timeshared between the two channels). After the coefficient address generator 416 counts up to the mid-range value (in Table I the mid-range is eight counting zero to seven), the XOR array 412 of the coefficient address generator 416 performs an exclusive or logic operation of the most significant bit with the current address count and then counts down the address because only thirty-two values (eight values in Table I) for each coefficient are required. The additional bit which is concatenated on to the five bits in the circuit 400 designed for 64 samples per symbol bit (three bits in the Table I example designed for 16 samples per symbol bit) represents a control bit that selects the desired pair of coefficient values from the memory (i.e. either C0x+C0y or C0x−C0y) based on whether the data symbol for I0 is the same or different from I7. If the data symbol for I0 is the same as I7, C0x+C0y is selected and if data symbol for I0 is different from I7, C0x−C0y is selected. Then the SELI07 or SELQ07 is used as determined by the truth table logic of Table II to select either the positive or negative coefficient value for either the I or Q channel. The baseband bit shaping techniques can also be used for digital low pass filters having with symmetric coefficients.

All publications and references cited herein are expressly incorporated herein by reference in their entirety.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. A method for shaping a baseband signal comprising:
   providing a plurality of coefficient memories, each having a plurality of coefficients values representing filter response waveform values;
   determining a coefficient memory address for each of the coefficient memories;
   addressing each of the plurality of coefficient memories;
   retrieving an addressed coefficient value from each of the plurality of coefficient memories;
   providing a negative value for each of the retrieved ones of the plurality of coefficient values;
   selecting in response to the baseband signal for each coefficient value, one of the retrieved coefficient value and the negative value; and
   summing the selected values for providing a shaped signal;
      wherein coefficient values at an instance in time are each indicative by a digital word and wherein one of the digital words and a corresponding negative value of the digital word are selected in response to the baseband signal, and the selected digital words are summed for providing a shaped baseband signal.

2. The method of claim 1 further comprising sharing the plurality of coefficient memories for shaping both an in-phase baseband signal and a quadrature baseband signal.

3. The method of claim 2 wherein sharing the plurality of memories comprises:
   retrieving one of the coefficient values corresponding to the in-phase baseband signal on a first edge of a clock signal; and retrieving one of the coefficient values corresponding to the quadrature baseband signal on a different second edge of the clock signal.

4. The method of claim 3 wherein the clock signal comprises a digital to analog converter clock signal.

5. The method of claim 1 wherein determining a coefficient memory address comprises:
determining an increment for providing a predetermined number of samples for each of a plurality of symbols comprising the baseband signal;
and incrementing an address counter in response to the predetermined number of samples for each symbol and a predetermined coefficient memory size.

6. The method of claim 1 wherein the baseband signal comprises an in-phase signal and a quadrature signal;
wherein selecting for each coefficient value comprises selecting an in-phase value in response to the in-phase signal and selecting a quadrature value in response to the quadrature signal; and
wherein summing the selected values comprises summing the selected in phase values for providing a shaped in phase signal and summing the selected quadrature values for providing a shaped quadrature signal.

7. The method of claim 1 wherein the negative value comprises at least one of:
a 2's complement value;
an offset binary value; and
a signed magnitude value.

8. The method of claim 1 wherein providing a plurality of coefficient memories comprises combining at least two filter coefficients for forming the plurality of coefficient values such that coefficient memory storage is minimized.

9. The method of claim 1 wherein the plurality of coefficient memories provided further provide coefficient values corresponding to a plurality of roll-off factors.

10. The method of claim 1 wherein the plurality of coefficient memories further includes one of:
the sum of a first filter response value and a second filter response value;
and the difference of a first filter response value and a second filter response value; and
wherein the step of retrieving an addressed coefficient value retrieves one of the sum of a first filter response value and a second filter response value and the difference of a first filter response value and a second filter response value.

11. The method of claim 10 wherein the first filter response and the second filter response are symmetric.

12. The method of claim 10 wherein retrieving coefficient values comprises:
providing an address counter having a plurality of logic outputs for addressing the coefficient memories; and
determining for each coefficient memory whether to retrieve one of the sum of a first filter response value and a second filter response value and the difference of a first filter response value and a second filter response value in response to selected ones of the logic outputs.

13. The method of claim 12 further comprising:
providing a logic circuit having an output, a first input coupled to a logic output of the address counter, a second input coupled to an in-phase data symbol bit and a third input coupled to a quadrature data symbol bit;
determining whether to select one of the retrieved value and the negative value in response to the output of the logic circuit.

14. The method of claim 10 wherein summing the selected value comprises:
providing a plurality of adder stages, each adder coupled to a pipeline register;
clocking the pipeline register at a digital to analog converter (D/A) rate; and scaling and formatting the summed values after a final adder stage.

15. A method for shaping a baseband signal comprising:
providing a plurality of coefficient memories, each having a plurality of coefficients values representing filter response waveform values;
determining a coefficient memory address for each of the coefficient memories;
addressing each of the plurality of coefficient memories;
retrieving an addressed coefficient value from each of the plurality of coefficient memories;
providing a negative value for each of the retrieved ones of the plurality of coefficient values;
selecting in response to the baseband signal for each coefficient value, one of the retrieved coefficient value and the negative value; and
summing the selected values for providing a shaped signal; and
wherein the plurality of coefficient memories further includes one of the sum of a first filter response value and a second filter response value and the difference of a first filter response value and a second filter response value; and
wherein the baseband signal is clocked at a symbol rate and the retrieval of coefficients is clocked at a digital to analog converter (D/A) rate such that the number of retrievals per coefficient equals the D/A rate divided by the symbol rate.

16. The method of claim 10 wherein the filter waveform comprises a raised cosine.

17. The method of claim 10 wherein the filter waveform comprises a square root raised cosine.

18. The method of claim 1 further comprising combining at least two filter coefficients for forming the plurality of coefficient values indicated by each digital word such that coefficient memory storage is minimized.

19. A device comprising:
a plurality of coefficient memories, each memory having an input address bus, a multiplexor input and a coefficient value output;
a plurality of first registers, each having a digital to analog (D/A) clock input and an input coupled to a respective one of the coefficient value outputs, and an output;
a plurality of negative value circuits, each circuit having an input coupled to a respective one of the first register outputs, and an output;
a plurality of 2:1 multiplexors, each having a first input coupled to an output of a respective one of the plurality of first registers and having a second input coupled to an output of a respective one of the plurality of negative value circuits;
a plurality of second registers, each having a digital to analog (D/A) clock input and an input coupled to a respective one of the outputs of the plurality of 2:1 multiplexors, and an output; and
an adder having a plurality of inputs coupled to respective ones of the plurality of second registers and an output to provide a baseband signal;
wherein coefficient values at an instance in time are each indicative by a digital word and wherein one of the digital words and a corresponding negative value of the digital word are selected in response to the baseband signal and the selected digital words are summed to provide the baseband signal.

20. The device of claim 19 wherein each of the plurality of negative value circuits comprises at least one of: a 2's complement logic element; an offset binary logic element; and a signed magnitude logic element.

21. The device of claim 19 further comprising a coefficient address generator having an output coupled to a coefficient memory input address bus, the input address having a plurality of address lines.

22. A device comprising:
a plurality of coefficient memories, each memory having an input address bus, a multiplexor input and a coefficient value output;
a plurality of first registers, each having a digital to analog (D/A) clock input and an input coupled to a respective one of the coefficient value outputs, and an output;
a plurality of negative value circuits, each circuit having an input coupled to a respective one of the first register outputs, and an output;
a plurality of 2:1 multiplexors, each having a first input coupled to an output of a respective one of the plurality of first registers and having a second input coupled to an output of a respective one of the plurality of negative value circuits;
a plurality of second registers, each having a digital to analog (D/A) clock input and an input coupled to a respective one of the outputs of the plurality of 2:1 multiplexors, and an output;
an adder having a plurality of inputs coupled to respective ones of the plurality of second registers; and
a coefficient address generator having an output coupled to a coefficient memory input address bus, the input address having a plurality of address lines; and
wherein the coefficient address generator further comprises:
an adder having a plurality of address output lines;
an address register coupled to the plurality of address output lines and having clocked address line outputs and an address counter most significant bit output;
an exclusive or logic gate (XOR) array having address inputs coupled to the clocked address lines outputs and an address counter most significant bit input coupled to the address counter most significant bit output, and outputs coupled to a corresponding plurality of the plurality of address lines of the coefficient memory address bus; and
an XOR multiplexor having inputs coupled a pair of baseband bit signals and an output coupled to one of the plurality of address lines of the coefficient memory address bus.

* * * * *

UNITED STATES PATENT AND TRADEMARK OFFICE
CERTIFICATE OF CORRECTION

PATENT NO. : 7,346,125 B2
APPLICATION NO. : 10/511862
DATED : March 18, 2008
INVENTOR(S) : Washakowski et al.

It is certified that error appears in the above-identified patent and that said Letters Patent is hereby corrected as shown below:

On the Title Page, Item (57) Abstract, line 4, delete "plurality shift" and replace with -- plurality of shift --.

Col. 1, line 22, delete "communications" and replace with -- communication --.

Col. 1, line 41, delete "Inputs" and replace with -- Input --.

Col. 2, line 56, delete "aspect the" and replace with -- aspect of the --.

Col. 3, line 16, delete "represent" and replace with -- represents --.

Col. 4, line 2, delete "in phase" and replace with -- in-phase --.

Col. 5, line 8-9, delete "appreciated a" and replace with -- appreciated that a --.

Col. 5, line 51, delete "amplifier have" and replace with -- amplifier to have --.

Col. 6, line 15, delete "twos" and replace with -- two's --.

Col. 7, line 24, delete "both I" and replace with -- both the I --.

Col. 7, line 37, delete "in phase" and replace with -- in-phase --.

Col. 7, line 52, delete "include a shift" and replace with -- include shift --.

Col. 8, line 28, delete "set" and replace with -- sets --.

Col. 10, line 63, delete "input" and replace with -- inputs --.

Col. 11, line 5, delete "input" and replace with -- inputs --.

Col. 11, line 30, delete "for a sixteen" and replace with -- for sixteen --.

Col. 12, line 66, delete "out)," and replace with -- output), --.

Col. 13, line 11, delete "exists the" and replace with -- exists for the --.

Col. 13, line 34, delete "register" and replace with -- registers --.

UNITED STATES PATENT AND TRADEMARK OFFICE
CERTIFICATE OF CORRECTION

PATENT NO.       : 7,346,125 B2
APPLICATION NO.  : 10/511862
DATED            : March 18, 2008
INVENTOR(S)      : Washakowski et al.

It is certified that error appears in the above-identified patent and that said Letters Patent is hereby corrected as shown below:

Col. 13, line 58, delete "value," and replace with -- values, --.

Col. 14, line 26, delete "having with symmetric" and replace with
-- having symmetric --.

Col. 14, line 40, delete "coefficients values" and replace with -- coefficient value --.

Col. 15, line 21, delete "in phase" and replace with -- in-phase --.

Col. 15, line 21-22, delete "in phase" and replace with -- in-phase --.

Col. 15, line 34, delete "provided further provide" and replace with -- further provide --.

Col. 16, line 10, delete "coefficients values" and replace with -- coefficient value --.

Col. 18, line 16, delete "lines" and replace with -- line --.

Col. 18, line 22, delete "coupled a" and replace with -- coupled to a --.

Signed and Sealed this

Twenty-third Day of September, 2008

JON W. DUDAS
*Director of the United States Patent and Trademark Office*